United States Patent
Choi et al.

(10) Patent No.: US 10,034,236 B2
(45) Date of Patent: Jul. 24, 2018

(54) METHOD AND APPARATUS FOR RECEIVING DATA UNIT

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR); Jinyoung Chun, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/116,491

(22) PCT Filed: Dec. 11, 2014

(86) PCT No.: PCT/KR2014/012210
§ 371 (c)(1),
(2) Date: Aug. 3, 2016

(87) PCT Pub. No.: WO2015/119372
PCT Pub. Date: Aug. 13, 2015

(65) Prior Publication Data
US 2016/0353370 A1    Dec. 1, 2016

Related U.S. Application Data

(60) Provisional application No. 61/935,805, filed on Feb. 4, 2014, provisional application No. 62/001,073, filed on May 21, 2014.

(51) Int. Cl.
*H04W 48/20* (2009.01)
*H04L 27/26* (2006.01)
*H04W 84/12* (2009.01)

(52) U.S. Cl.
CPC ......... *H04W 48/20* (2013.01); *H04L 27/2613* (2013.01); *H04W 84/12* (2013.01)

(58) Field of Classification Search
CPC .... H04W 48/20; H04W 84/12; H04L 27/2613
See application file for complete search history.

(56) References Cited

U.S. PATENT DOCUMENTS

2012/0327914 A1* 12/2012 Kang ................. H04L 5/0023
                                                                370/336
2013/0287013 A1   10/2013 Kwon
(Continued)

FOREIGN PATENT DOCUMENTS

| WO | 2013147413 |    | 10/2013 |
|----|------------|----|---------|
| WO | 2013165582 | A1 | 11/2013 |
| WO | 2013169044 | A1 | 11/2013 |

OTHER PUBLICATIONS

European Patent Office Application Serial No. 14881974.1, Search Report dated Jun. 23, 2017, 10 pages.

*Primary Examiner* — Gary Mui
(74) *Attorney, Agent, or Firm* — Lee Hong Degerman Kang Waimey

(57) ABSTRACT

Disclosed are a method and an apparatus for receiving a data unit. A method for receiving a data unit in a wireless local area network can comprise the steps of: an STA transmitting an association request frame to an AP, the association request frame containing PPDU format request information; and the STA receiving, from the AP, an association response frame as a response for the association request frame, the association response frame containing PPDU format determination information, wherein the PPDU format request information can comprise PPDU format information for the AP to communicate with the STA, and the PPDU format (Continued)

determination information can comprise information for whether the communication will be carried out on the basis of a PPDU format.

12 Claims, 25 Drawing Sheets

(56) References Cited

U.S. PATENT DOCUMENTS

| | | |
|---|---|---|
| 2013/0294397 A1 | 11/2013 | Lee et al. |
| 2013/0315163 A1 | 11/2013 | Zhang et al. |
| 2013/0315218 A1* | 11/2013 | Cheong ............... H04W 16/26 370/338 |
| 2014/0286203 A1* | 9/2014 | Jindal ................. H04J 11/0026 370/278 |
| 2014/0307650 A1* | 10/2014 | Vermani ............... H04L 5/0044 370/329 |
| 2014/0362842 A1* | 12/2014 | Dong .................... H04W 48/12 370/338 |
| 2015/0009978 A1* | 1/2015 | Choi ................. H04L 25/03866 370/338 |
| 2015/0023335 A1* | 1/2015 | Vermani ............... H04B 7/0452 370/338 |
| 2015/0124750 A1* | 5/2015 | Vermani ............. H04L 27/2636 370/329 |
| 2015/0131624 A1* | 5/2015 | Merlin ................ H04W 52/243 370/336 |
| 2016/0301491 A1* | 10/2016 | Porat ..................... H04W 24/08 |
| 2016/0360516 A1* | 12/2016 | Karout ..................... H04L 1/00 |

* cited by examiner

METHOD AND APPARATUS FOR RECEIVING DATA UNIT

CROSS-REFERENCE TO RELATED APPLICATIONS

This application is the National Stage filing under 35 U.S.C. 371 of International Application No. PCT/KR2014/012210, filed on Dec. 11, 2014, which claims the benefit of U.S. Provisional Application No. 61/935,805, filed on Feb. 4, 2014, and 62/001,073, filed on May 21, 2014, the contents of which are all hereby incorporated by reference herein in their entirety.

BACKGROUND OF THE INVENTION

Field of the Invention

The present invention relates to wireless communication and, more particularly, to a method and apparatus for receiving data units in a wireless local area network (WLAN).

Related Art

Data is delivered through data units that are referred to as a PPDU (physical layer protocol data unit) of the IEEE 802.11. The PPDU may broadly include a PHY (physical) preamble, a PHY header, and a PSDU (Physical layer service data unit).

The PHY preamble is used for delivery, such as signal detection, time and frequency synchronization, channel estimation, and so on, and may include a training symbol. The PHY header may transmit a TXVECTOR. As a MPDU (MAC (medium access control) protocol data unit), the PSDU may correspond to information that is sent down from the MAC layer. As a data unit that is generated in the MAC layer, the MPDU may include a MAC header and a MSDU (MAC service data unit).

The goal of the next generation WLAN system is 1) to enhance a 802.11 PHY (physical) layer and a MAC (medium access control) layer in bands of 2.4 GHz and 5 GHz, etc., 2) to enhance spectrum efficiency and area throughput, and 3) to enhance performance in actual indoor environments and outdoor environments, such as an environment where an interference source exists, a dense heterogeneous network environment, an environment where user load exists, and so on. The scenario that is mostly considered in the next generation WLAN system corresponds to a dense environment where a large number of APs (access points) and STAs (stations) exist. In the next generation WLAN system, discussion is made on the enhancement of spectrum efficiency and area throughput under such environments. Most particularly, in addition to the indoor environments, the next generation WLAN system is interested in actually enhancing the performance in outdoor environments, which was not significantly considered in the conventional WLAN system.

Furthermore, in the next generation WLAN system, extensive discussion is expected to be carried out on the enhancement of system performance in an OBSS (overlapping basic service set) environment, the enhancement of performance in outdoor environments, cellular off-loading, and so on, rather than the enhancement of a single link performance in a single BSS (basic service set).

SUMMARY OF THE INVENTION

Technical Objects

An object of the present invention is to provide a method for receiving data units in a WLAN.

Another object of the present invention is to provide an apparatus for receiving data units in a WLAN.

Technical Solutions

In order to achieve the above-described technical object of the present invention according to an aspect of the present invention, a method for receiving data units in a wireless LAN may include the steps of transmitting an association request frame by a STA (station) to an AP (access point), wherein the association request frame includes PPDU (physical layer protocol data unit) format request information, and receiving an association response frame by the STA from the AP as a response to the association request frame, wherein the association response frame includes PPDU format decision information, wherein the PPDU format request information may include information on a PPDU format allowing the STA to establish communication with the AP, and wherein the PPDU format decision information may include information on whether or not to perform the communication based on the PPDU format.

In order to achieve the above-described technical object of the present invention according to another aspect of the present invention, a STA (station) receiving data units in a wireless LAN, the STA may include a RF (radio frequency) unit configured to transmit and receive radio signals and a processor being optionally connected to the RF unit, wherein the processor may be configured to transmit an association request frame to an AP (access point), wherein the association request frame may include PPDU (physical layer protocol data unit) format request information, and to receive an association response frame from the AP as a response to the association request frame, wherein the association response frame may include PPDU format decision information and the PPDU format request information may include information on a PPDU format allowing the STA to establish communication with the AP, and wherein the PPDU format decision information may include information on whether or not to perform the communication based on the PPDU format.

Effects of the Invention

An overhead of a preamble may be reduced based on a newly defined PPDU, and the data transmission rate may be enhanced.

DESCRIPTION OF EXEMPLARY EMBODIMENTS

Figure 1:
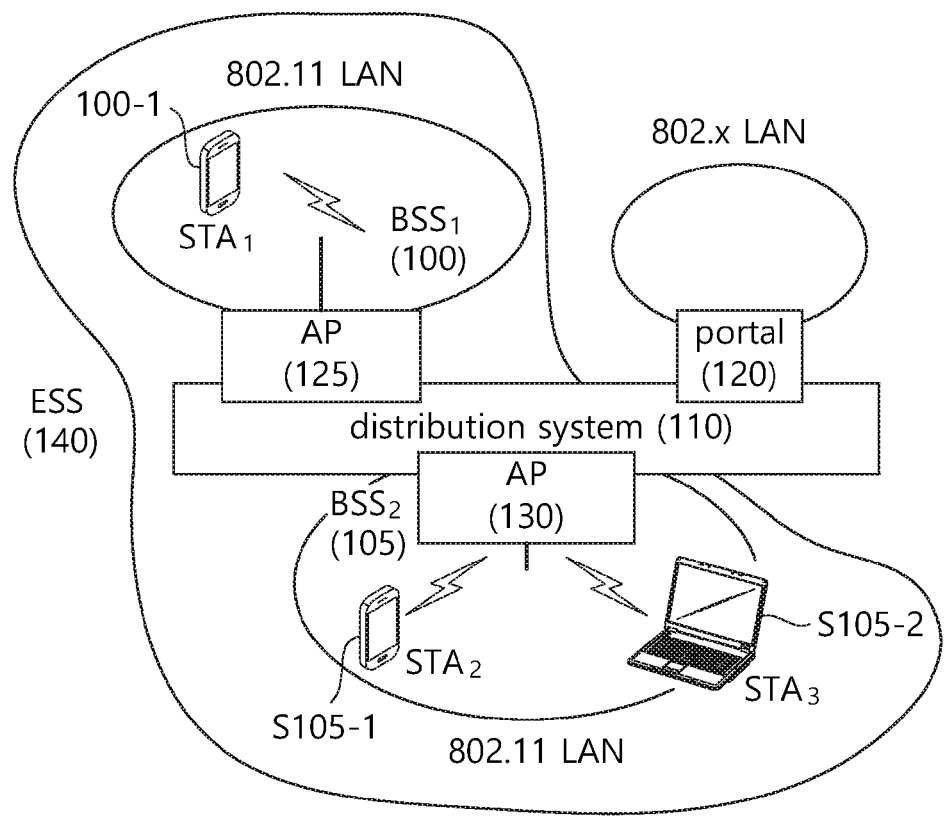
FIG. 1 illustrates a concept view illustrating the structure of a wireless local area network (WLAN).
Figure 1:
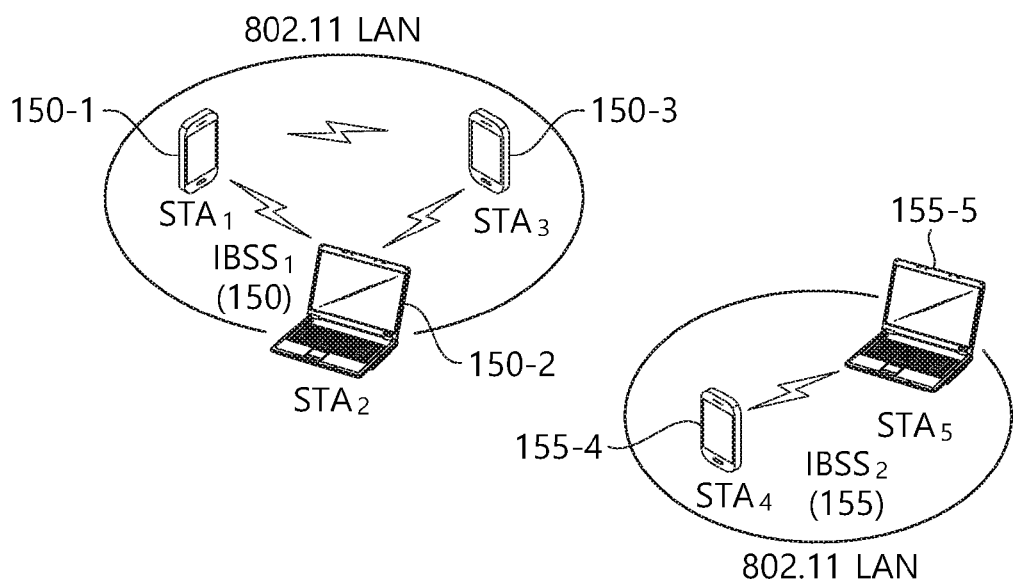

FIG. 1 illustrates a concept view illustrating the structure of a wireless local area network (WLAN).

In upper portion of FIG. 1 shows the structure of the IEEE (institute of electrical and electronic engineers) 802.11 infrastructure network.

Referring to the upper portion of FIG. 1, the WLAN system may include one or more basic service sets (BSSs) 100 and 105. The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower portion of FIG. 1 is a concept view illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
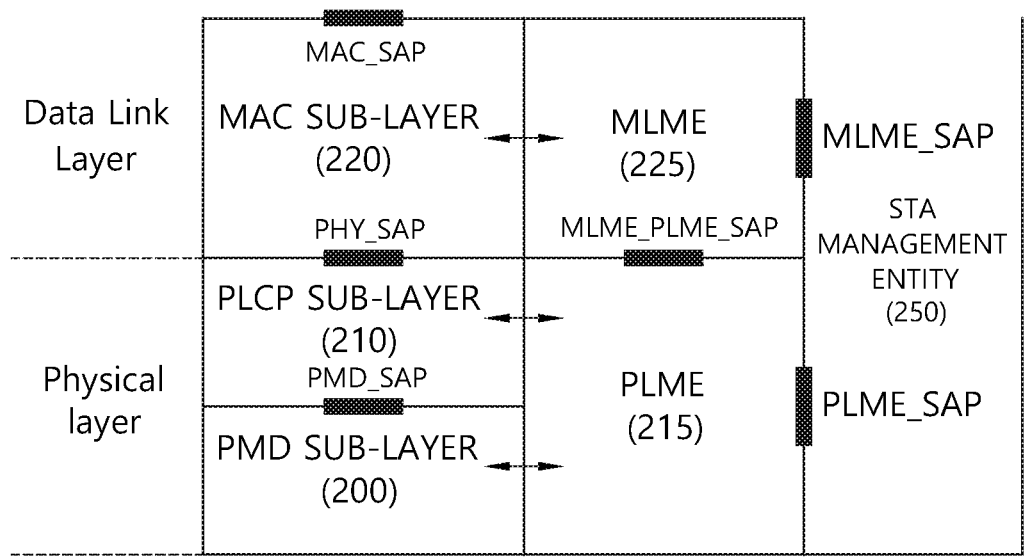
FIG. 2 illustrates a view illustrating a layer architecture of a WLAN system supported by IEEE 802.11.

FIG. 2 illustrates a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity) 225, and the management entity of the physical layer is denoted a PLME (PHY layer management entity) 215. Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity) 250 to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
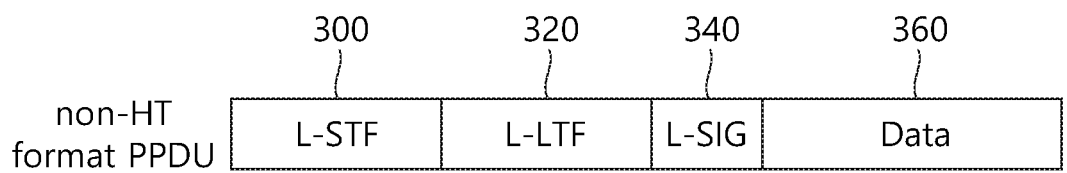
FIG. 3 illustrates a schematic view illustrating a physical layer convergence procedure (PLCP) protocol data unit (PPDU) in a non-high throughput (HT) format.

FIG. 3 illustrate s a schematic view illustrating a physical layer convergence procedure (PLCP) protocol data unit (PPDU) in a non-high throughput (HT) format.

FIG. 3 illustrates a non-HT PPDU format supporting IEEE 802.11a/g. A PPDU in a non-HT format ("non-HT PPDU") may also be represented as a PPDU in a legacy format ("legacy PPDU").

Referring to FIG. 3, the non-HT PPDU may include a legacy-short training field (L-STF) 300, a legacy-long training field (L-LTF) 320, a legacy SIGNAL field (L-SIG) 340 and a Data 360.

The L-STF 300 may include a short training orthogonal frequency division multiplexing (OFDM) symbol. The L-STF 300 may be used for frame detection, automatic gain control (AGC), diversity detection and coarse frequency/time synchronization.

The L-LTF 320 may include a long training OFDM symbol. The L-LTF 320 may be used for fine frequency/time synchronization and channel prediction.

The L-SIG 340 may be used to transmit control information. The L-SIG 340 may include information on data rate and data length.

The Data 360 is a payload, which may include a SERVICE field, a scrambled PLCP service data unit (PSDU), tail bits and padding bits.

Figure 4:
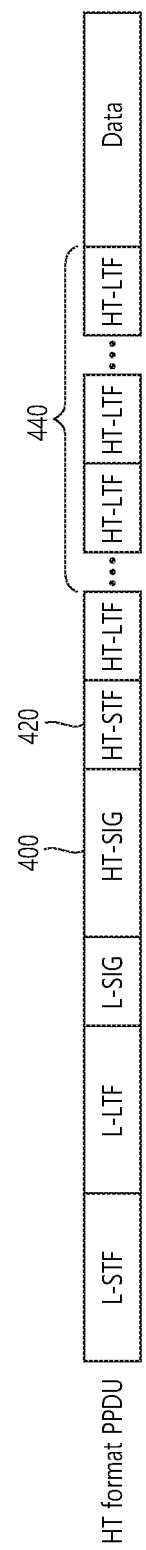
FIG. 4 illustrates a schematic view illustrating a PPDU in an HT format.

FIG. 4 illustrates a schematic view illustrating a PPDU in an HT format.

FIG. 4 illustrates a PPDU in an HT-mixed format ("HT-mixed PPDU") for supporting both IEEE 802.11n and IEEE 802.11a/g among PPDUs in the HT format ("HT PPDUs").

Referring to FIG. 4, the HT-mixed PPDU may further include an HT-SIG 400, an HT-STF 420 and an HT-LTF 440 in addition to the non-HT PPDU illustrated in FIG. 3.

The HT-SIG 400 may include information for interpreting the HT-mixed PPDU. For example, the HT-SIG 400 may include a modulation and coding scheme (MCS) information, PSDU length information, space time block coding (STBC) information, or the like.

The HT-STF 420 may be used for improvement in AGC performance, timing synchronization and frequency synchronization. The HT-STF 420 has a total length of 4 μs, which is the same as that of the L-STF, but has a different cyclic delay value from the L-STF.

The HT-LTF 440 may be used for multiple-input multiple-output (MIMO) channel estimation and fine carrier frequency offset (CFO) estimation. An station (STA) supporting IEEE 802.11n needs to estimate as many channels as the number of space time streams (or spatial streams), and thus the number of HT-LTFs 440 may increase depending on the number of space time stream.

Figure 5:
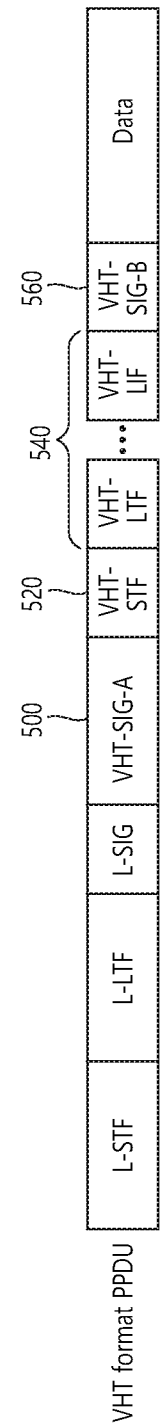
FIG. 5 illustrates a schematic view illustrating a PPDU in a very high throughput (VHT) format.

FIG. 5 illustrates a schematic view illustrating a PPDU in a very high throughput (VHT) format.

Referring to FIG. 5, the PPDU in the VHT format ("VHT PPDU") may include an L-STF, an L-LTF, an L-SIG, a VHT-SIG-A, a VHT-STF, VHT-LTFs, a VHT-SIG-B and a Data.

The L-STF field, L-LTF field and L-SIG field are fields included in a non-HT PPDU as described above in FIG. 3. The remaining VHT-SIG-A 500, VHT-STF 520, VHT-LTF 540 and VHT-SIG-B 560 may be included only in the VHT PPDU.

The VHT-SIG-A 500 may include information for interpreting the VHT PPDU. The VHT-SIG-A 500 may include a VHT-SIG-A1 and a VHT-SIG-A2. The VHT-SIG-A1 may include bandwidth information on a used channel, whether space time block coding is applied, a group identifier (ID) indicating a group used for transmission of grouped STAs in multi-user (MU) MIMO and information on the number of used streams.

The VHT-SIG-A2 may include information on whether a short guard interval (GI) is used, forward error correction (FEC) information, information on an MCS for a single user, information on channel coding types for multiple users, beamforming related information, redundancy bits for cyclic redundancy checking (CRC) and tail bits of a convolutional decoder.

The VHT-STF 520 may be used to improve automatic gain control estimation in an MIMO environment.

The VHT-LTF 540 is used to estimate a channel in an MIMO environment.

The VHT-SIG-B 560 may include information on each STA, that is, information on PSDU length and a MCS, tail bits, or the like.

Figure 6:
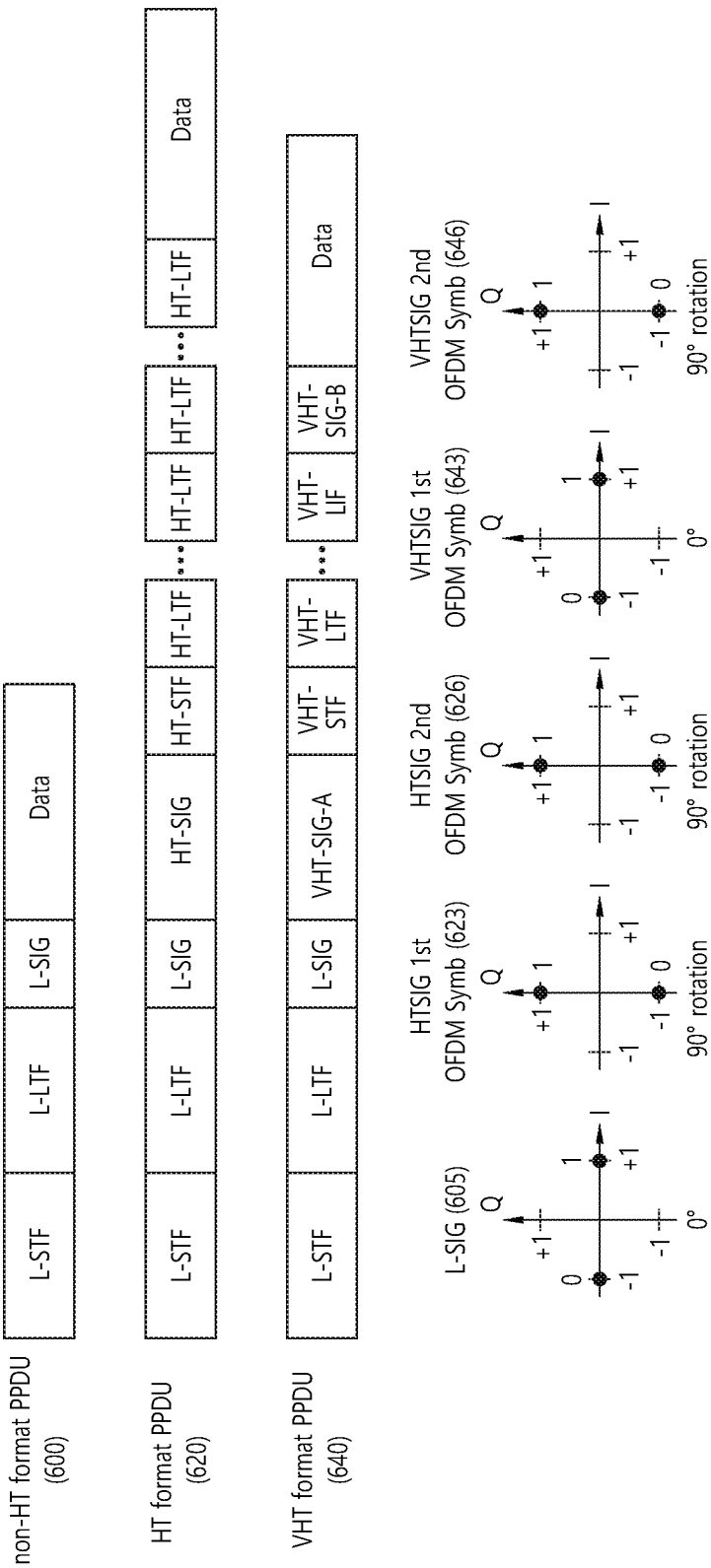
FIG. 6 illustrates a schematic view illustrating a method of transmitting a field included in each PPDU.

FIG. 6 illustrates a schematic view illustrating a method of transmitting a field included in each PPDU.

FIG. 6 illustrates a modulation scheme for a field included in each PPDU (non-HT PPDU 600, HT PPDU 620 or VHT PPDU 640). An STA may distinguish a PPDU based on a modulation scheme for a field included in a received PPDU. Distinguishing a PPDU (or distinguishing a PPDU format) may be interpreted in different meaning. For example, distinguishing a PPDU may include determining whether a received PPDU is decodable (or interpretable) by an STA. Further, distinguishing a PPDU may mean determining whether a received PPDU is a PPDU that an STA is capable of supporting. Alternatively, distinguishing a PPDU may mean distinguishing what information transmitted through a received PPDU is.

If PPDUs are in different formats, different modulation schemes may be used for fields after an L-SIG. The STA may distinguish a PPDU format based on a modulation scheme for fields after an L-SIG included in a received PPDU.

In a non-HT PPDU 600 illustrated at the top of FIG. 6, a modulation scheme for an L-SIG may be binary phase shift keying (BPSK). Specifically, data transmitted through an OFDM symbol 605 corresponding to the L-SIG may be generated based on a constellation for BPSK ("BPSK constellation").

In an HT PPDU 620 illustrated in the middle of FIG. 6, a modulation scheme for an HT-SIG after an L-SIG may be QBPSK. Specifically, data transmitted through a first OFDM symbol 623 and a second OFDM symbol 626 corresponding to the HT-SIG may be generated based on a constellation for QBPSK ("QBPSK constellation"). The QBPSK constellation may be a constellation rotated counterclockwise by 90 degrees based on the BPSK constellation. The STA may distinguish a PPDU based on a received modulation scheme for a field.

For example, the STA may detect a start point of the HT-SIG based on an in-phase (I)/quadrature (Q) signal-power ratio of received data. Specifically, the STA may detect the HT-SIG based on a change in a modulation scheme (or change in a constellation) used for the received data. Further, the STA may determine whether the received PPDU is a non-HT PPDU or HT PPDU based on information on the modulation scheme (or constellation) used for the received data.

In a VHT PPDU 640 illustrated at the bottom of FIG. 6, a modulation scheme for a VHT-SIG-A after an L-SIG may be BPSK and QBPSK. Specifically, data transmitted through a first OFDM symbol 643 corresponding to the VHT-SIG-A may be generated based on a BPSK constellation, and data transmitted through a second OFDM 646 corresponding to the VHT-SIG-A may be generated based on a QBPSK constellation.

Likewise, the STA may detect a VHT-SIG-A based on a change in a modulation scheme (or change in a constellation) used for the received data. Also, the STA may determine whether the received PPDU is a non-HT PPDU, HT PPDU or VHT PPDU based on information on the modulation scheme (or constellation) used for the received data.

A modulation scheme for a field by each PPDU format for distinguishing a PPDU may be represented by a term "auto-detection rule." The STA may distinguish a PPDU based on a modulation scheme for a received field according to the auto-detection rule.

Hereinafter, the exemplary embodiment of the present invention not only discloses a method for distinguishing a conventional PPDU (non-HT PPDU, HT PPDU or VHT PPDU) based on a method for modulating a field included in a received PPDU but also a method for distinguishing a PPDU according to an exemplary embodiment of the present invention.

Hereinafter, a frame according to the exemplary embodiment of the present invention may be expressed by using the term non-legacy frame, and a PPDU according to the exemplary embodiment of the present invention may be expressed by using the term non-legacy PPDU, and an STA supporting the non-legacy PPDU according to the exemplary embodiment of the present invention may be expressed by using the term non-legacy STA. And, a non-legacy WLAM system may correspond to a WLAN system that supports a non-legacy STA.

Additionally, a conventional PPDU, such as non-HT PPDU, HT PPDU, VHT PPDU, and so on, may be expressed by using the term legacy PPDU, and a frame being delivered based on the legacy PPDU may be expressed by using the term legacy frame, and an STA that only supports the legacy PPDU may be expressed by using the term legacy STA. The legacy STA may also perform decoding on part of the field of a non-legacy PPDU. A legacy WLAN system may correspond to a system supporting the legacy STA.

The non-legacy PPDU may be transmitted or received in an environment where the legacy STA and the non-legacy STA co-exist. In this environment, in case legacy STAs fail to satisfy the backward compatibility respective to the non-legacy PPDU, this may cause significant influence on the conventional legacy WLAN system. Therefore, the non-legacy PPDU is required to be designed while considering its influence caused on the legacy STAs.

In the related art auto-detection rule, by configuring the method for modulating a field that is positioned after the L-SIG of the PPDU differently, the differentiation between PPDUs having different formats or structures was made possible. In case of using the non-legacy PPDU, a method for allowing the STA to differentiate non-legacy PPDUs while maintaining the related art auto-detection rule is required. More specifically, the non-legacy PPDU is required to be defined by using a nested method (a method of adopting a new method while maintaining the prior art method).

Hereinafter, a non-legacy PPDU according to the exemplary embodiment of the present invention is disclosed.

Figure 7:
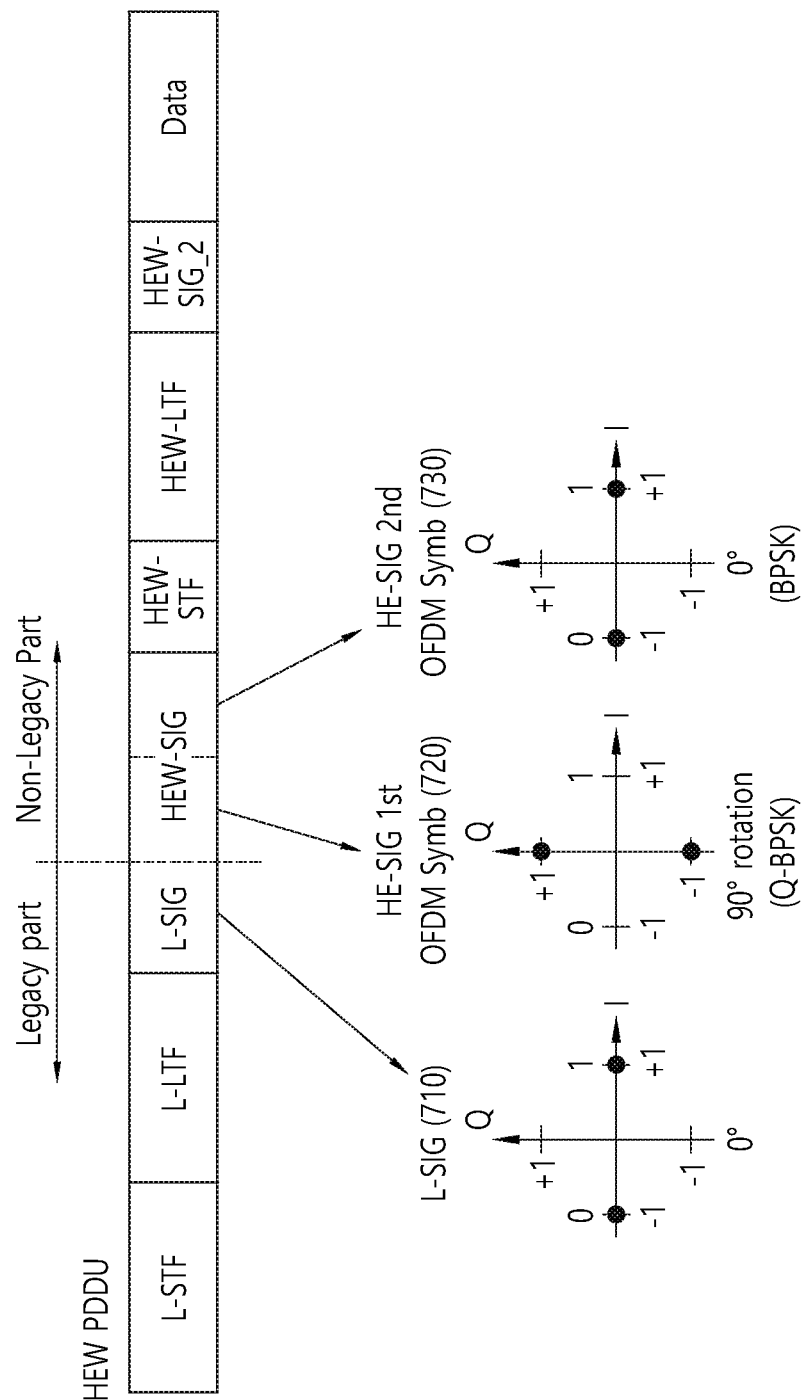
FIG. 7 illustrates a conceptual view of a non-legacy PPDU according to the present invention.

FIG. 7 illustrates a conceptual view of a non-legacy PPDU according to the present invention.

Referring to FIG. 7, a non-legacy PPDU may be divided into a legacy part, which corresponds to a part up to the L-SIG, and a non-legacy part, which corresponds to a part after the L-SIG, for simplicity. For example, the non-legacy part may include non-legacy fields for supporting operations within a non-legacy WLAN system, such as HE (high efficiency)-SIG, HE-STF, HE-LTF, and HE-SIG2. Such non-legacy fields correspond to exemplary fields for interpreting the non-legacy PPDU excluding the legacy part. The HE-SIG may be positioned after the L-SIG of the legacy part. In order to support the non-legacy WLAN system, a signal field, such as HE-SIG, may include diverse information. For example, in case channel access of multiple STAs is performed based on OFDMA (orthogonal frequency division multiple access), the HE-SIG may transmit information on frequency resource (e g, channel) for data transmission and data reception, information on downlink resource allocation and uplink resource allocation, and so on, respective to each of the multiple STAs. Additionally, the HE-SIG may also include information for supporting uplink MIMO (multiple input multiple output). The HE-SIG may also include information for interference management of STAs in a dense environment having critical interference.

According to the exemplary embodiment of the present invention, in order to differentiate the non-legacy PPDU and the legacy PPDU from one another, the L-SIG and the HE-SIG may be transmitted based on a modulation method that is shown below.

In a non-legacy PPDU, the modulation method respective to the L-SIG may correspond to BPSK. More specifically, a symbol that is being transmitted over an OFDM symbol for the L-SIG (reference OFDM symbol) 710 may be generated based on a BPSK constellation (reference constellation). In other words, a symbol being generated based on a BPSK constellation may be transmitted over an OFDM symbol for the L-SIG. In the exemplary embodiment of the present invention, although it is described that the L-SIG is being transmitted over one OFDM symbol, in case the L-SIG is transmitted over multiple OFDM symbols, the reference OFDM symbol may correspond to the last OFDM symbol among the multiple OFDM symbols for the L-SIG.

In the non-legacy PPDU, a modulation method that is being used for the transmission of the HE-SIG may correspond to QBPSK and BPSK. More specifically, a symbol that is being transmitted over a first OFDM symbol for the HE-SIG ($1^{st}$ OFDM symbol) 720 may be generated based on a QBPSK constellation. As compared to the BPSK constellation, the QBPSK constellation may correspond to a constellation that is rotated by 90 degrees (90°).

A symbol that is being transmitted over a second OFDM symbol for the HE-SIG ($2^{nd}$ OFDM symbol) 730 may be generated based on a BPSK constellation.

BPSK and QBPSK, which are disclosed in the exemplary embodiment of the present invention, respectively correspond to examples for different modulation methods. BPSK may also be expressed by using the term reference modulation method, and QBPSK may also be expressed by using the term rotated modulation method. The reference modulation method corresponds to a modulation method that is used as reference for comparison with other modulation methods, and a constellation for the reference modulation method may also be expressed by using the term reference constellation. The rotated modulation method may correspond to a modulation method using a constellation that is rotated by a predetermined angle with respect to the reference constellation. For simplicity in the description, the exemplary embodiment of the present invention discloses changes in the modulation method mostly with respect to BPSK and QBPSK.

Table 1 shown below discloses constellations that are used for symbols being transmitted over an OFDM symbol, which transmits a field included in the legacy PPDU and the non-legacy PPDU.

Referring to Table 1, the STA may differentiate the PPDU that is received based on a modulation method (or a constellation that is used in the OFDM symbol) of a symbol, which is transmitted over an OFDM symbol (e.g., reference OFDM symbol, $1^{st}$ OFDM symbol, or $2^{nd}$ OFDM symbol). In other words, the STA may determine a rotation of the constellation that is used in a symbol, which is transmitted over an OFDM symbol transmitting the received PPDU, and may then differentiate the received PPDU.

Hereinafter, an exemplary determination process for differentiating the received PPDU of the STA will be disclosed.

If a case when a non-legacy STA receives the PPDU is assumed, in case the constellation that is used for the symbol being transmitted over the first OFDM symbol does not correspond to a QBPSK constellation, the non-legacy STA may differentiate the received PPDU as a VHT PPDU or a non-HT PPDU. The non-legacy STA may additionally determine whether or not a QBPSK constellation has been used for the symbol being transmitted over the second OFDM symbol. In case the QBPSK has been used for the symbol being transmitted over the second OFDM symbol, the received PPDU may be determined as a VHT PPDU.

Additionally, in case the modulation method of the symbol being transmitted over the first OFDM symbol corresponds to QBPSK, the non-legacy STA may additionally determine a modulation constellation (or modulation method) of the symbol being transmitted over the second OFDM symbol and may then differentiate the PPDU. For example, the non-legacy STA may determine whether the BPSK constellation has been used or whether the QBPSK constellation has been used for the modulation of the symbol being transmitted over the second OFDM symbol. In case the BPSK constellation has been used for the modulation of the symbol being transmitted over the second OFDM symbol, the received PPDU may be differentiated as a HT PPDU, and, in case the QBPSK constellation has been used for the modulation of the symbol being transmitted over the second OFDM symbol, the received PPDU may be differentiated as a non-legacy PPDU.

Similarly, if a case when a legacy STA receives the PPDU is assumed, the legacy STA may determine the constellation that is used for the modulation of the symbol being transmitted over a first OFDM symbol or a second OFDM symbol after the reference symbol and may then differentiate the PPDU.

For example, in case the QBPSK constellation has not been used for the modulation of the symbol being transmitted over at least one of the first OFDM symbol and/or the second OFDM symbol, the non-HT STA may differentiate the received PPDU as a non-HT PPDU. In case the QBPSK constellation has been used for the modulation of the symbol being transmitted over the first OFDM symbol and the second OFDM symbol, the non-HT STA may differentiate the received PPDU as a HT PPDU. In case the BPSK constellation is used for the modulation of the symbol being

TABLE 1

|  | Reference OFDM symbol (constellation rotation angle) | $1^{st}$ OFDM symbol (constellation rotation angle) | $2^{nd}$ OFDM symbol (constellation rotation angle) |
| --- | --- | --- | --- |
| non-HT PPDU | L-SIG (BPSK) (0°) | data field | data field |
| HT PPDU | L-SIG (BPSK) (0°) | HT-SIG(QBPSK) (90°) | HT-SIG(QBPSK) (90°) |
| VHT PPDU | L-SIG (BPSK) (0°) | VHT-SIG-A(BPSK) (0°) | VHT-SIG-A(QBPSK) (90°) |
| non-legacy PPDU | L-SIG (BPSK) (0°) | HE-SIG(QBPSK) (90°) | HE-SIG(BPSK) (0°) | transmitted over the first OFDM symbol, and, in case the QBPSK constellation is used for the modulation of the symbol being transmitted over the second OFDM symbol, the VHT STA may determine the received PPDU as a VHT PPDU.

In case the legacy STA differentiates the PPDU based on the conventionally defined auto-detection method, and, in case the PPDU cannot be differentiated based on the conventional auto-detection method (e.g., in case the received PPDU correspond to a non-legacy PPDU), the legacy STA may delay channel access.

Based on a rotation of the constellation being used in the OFDM symbol, as shown in Table 1, the legacy STA may differentiate the PPDU based on the same method as the conventional method, and the non-legacy STA may differentiate a non-legacy PPDU.

In order to determine the constellation used in the OFDM symbol, which is included in the legacy PPDU and the non-legacy PPDU, the STA may use diverse methods. For example, by comparing a norm value between a real part and an imaginary part of the modulation symbol being transmitted through the OFDM symbol with a predetermined threshold value, the STA may determine whether the constellation that is used for generating the modulation symbol corresponds to the BPSK constellation or the QBPSK constellation.

In a non-legacy WLAN system, in addition to the constellation disclosed in FIG. 7, a combination of other variety of constellations may also be used for generating the PPDU.

Figure 8:
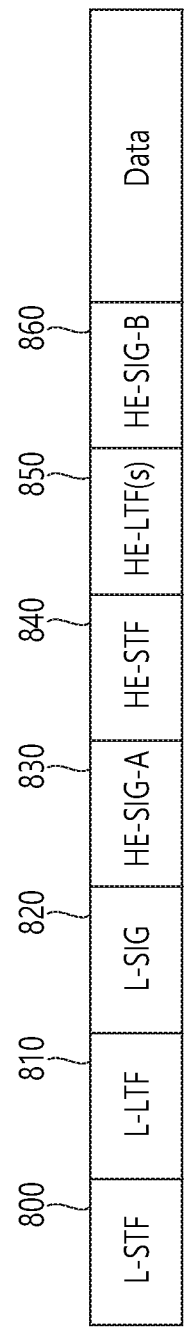
FIG. 8 illustrates a conceptual view of a non-legacy PPDU according to an exemplary embodiment of the present invention.

FIG. 8 illustrates a conceptual view of a non-legacy PPDU according to an exemplary embodiment of the present invention.

The non-legacy PPDU may be decided so as to be capable of reducing overhead of the preamble and to have backward compatibility with respect to the legacy STA.

The non-legacy PPDU may include a legacy part and a non-legacy part. The legacy part may include a L-STF 800, a L-LTF 810, and a L-SIG 820, and the non-legacy part may include a HE-SIG A 830, a HE-STF 840, a HE-LTF 850, and a HE-SIG B 860.

The HE-SIG A 830 may include the HE-STF 840 and bandwidth information respective to a field after the HE-STF 840. Based on the bandwidth information included in the HE-SIG A 830, the HE-STF 840 and the information on the bandwidth transmitting the field after the HE-STF 840 may be acquired without blind detection. More specifically, in case channel access is performed based on OFDMA, the HE-SIG A 830 may transmit information on a frequency resource (e.g., channel) for data transmission and reception, downlink resource allocation and uplink resource allocation information, and so on. Additionally, the HE-SIG A 830 may also include information for supporting uplink MIMO. The HE-SIG A 830 may also include information for interference management of STAs in a dense environment having critical interference. For example, the HE-SIG A 830 may include color bits information for BSS identification information, bandwidth information, tail bit, CRC bit, MCS information respective to HE-SIG B 860, and information on the number of symbols for the HE-SIG B 860, and CP (cyclic prefix) (or GI (guard interval)) length information. Hereinafter, the GI may be interpreted to have the same meaning as the CP.

The HE-STF 840 may be used for enhancing automatic gain control estimation in a MIMO (multiple input multiple output) environment or an OFDMA environment.

The HE-LTF 850 may be used for estimating channels in a MIMO environment or an OFDMA environment.

The HE-SIG B 860 may include information on a length MCS (modulation and coding scheme) of a PSDU (physical layer service data unit) respective to each STA, tail bit, and so on. Additionally, the HE-SIG B 860 may also include information on the STA that is to receive the PPDU, OFDMA-based resource allocation information (or MU-MIMO information). In case the OFDMA-based resource allocation information (or MU-MIMO associated information) is included in the HE-SIG B 860, the corresponding information may not be included in the HE-SIG A 830.

The size of the IFFT (or IDFT) being applied to the HE-STF 840 and to the field after the HE-STF 840 and the size of the IFFT (or IDFT) being applied to the field before the HE-STF 840 may be different from one another. Hereinafter, although the IFFT/FFT will be assumed and described as the transformation method, IDFT (inverse discrete fourier transform)/DFT (discrete fourier transform) may also be used in accordance with the embodiment.

For example, the size of the IFFT that is used for generating the HE-STF 840 and the field after the HE-STF 840 may be 4 times larger than the size of the IFFT that is applied to the field before the HE-STF 840. In case the STA is indicated based on the HE-SIG A 830, the STA may perform decoding based on the FFT size, which is changed starting from the HE-STF 840 and the field after the HE-STF 840. Conversely, in case the STA is not indicated based on the HE-SIG A 830, the STA may stop the decoding respective to the HE-STF 840 and the field after the HE-STF 840 and may configure a NAV (network allocation vector).

A CP (cyclic prefix) of the HE-STF 840 may have a size that is larger than the CP of other fields, and, during such CP interval, the STA may change its FFT size so as to perform decoding respective to the downlink PPDU.

Figure 9:
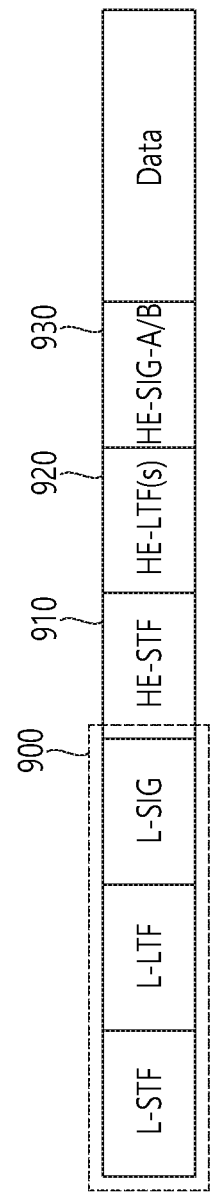
FIG. 9 illustrates a conceptual view of a non-legacy PPDU according to an exemplary embodiment of the present invention.
Figure 10:
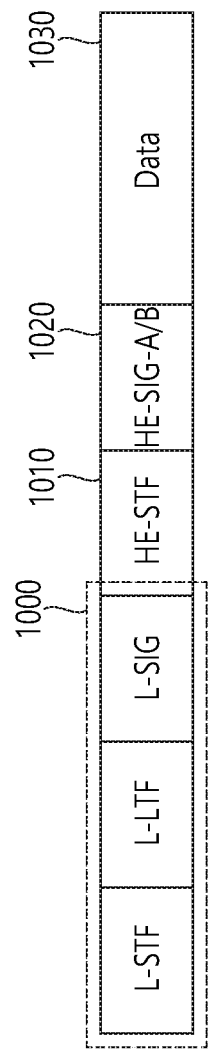
FIG. 10 illustrates a conceptual view of a non-legacy PPDU according to an exemplary embodiment of the present invention.
Figure 11:
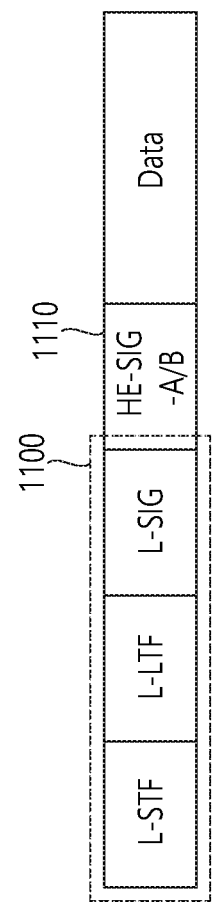
FIG. 11 illustrates a conceptual view of a non-legacy PPDU according to an exemplary embodiment of the present invention.

The order of the fields configuring the non-legacy PPDU, which is disclosed in FIG. 8 may be changed. FIG. 9 to FIG. 11 respectively disclose non-legacy PPDUs according to the exemplary embodiments of the present invention.

FIG. 9 illustrates a conceptual view of a non-legacy PPDU according to an exemplary embodiment of the present invention.

Referring to FIG. 9, the non-legacy PPDU may include a legacy part 900 and a non-legacy part. The legacy part 900 may include a L-STF, a L-LTF, and a L-SIG, as shown in FIG. 8. The non-legacy part may sequentially include a HE-STF 910, a HE-LTF 920, and a HE-SIG A/B 930. Although the information being included in each field is similar to the information disclosed in FIG. 8, the non-legacy PPDU disclosed in FIG. 9 may have the following characteristics.

In the non-legacy PPDU disclosed in FIG. 9, the HE-STF 910 precedes the HE-SIG A/B 930. Therefore, the HE-STF 910 of the non-legacy PPDU may transmit information on the transmission bandwidth (or bandwidth) information. In case the information on the transmission bandwidth information is transmitted through the HE-STF 910, the blind detection for the transmission bandwidth detection of the HE-STF 910 and/or the field after the HE-STF 910 may not be performed. For example, a sequence of the HE-STF 910 may include information on the transmission bandwidth. A specific sequence may be mapped to the size of the transmission bandwidth, and, then, based on the received sequence of the HE-STF 910, the STA may acquire information on a transmission bandwidth through which the HE-STF 910 and/or the field after the HE-STF 910 are/is transmitted. During the process of searching the sequence of the HE-STF 910, the non-legacy STA may acquire information on the transmission bandwidth, and the non-legacy STA may not perform blind detection respective to the transmission bandwidth information. The non-legacy STA may decide the transmission bandwidth of the HE-STF 910 and/or the field after the HE-STF 910 without blind detection. In this case, the HE-SIG A/B 930 may not include information on the transmission bandwidth.

Alternatively, the transmission bandwidth of the legacy part may be configured to be identical to the transmission bandwidth of the non-legacy part. In this case, the STA may perform decoding on the non-legacy part without any separate information on the transmission bandwidth of the non-legacy part.

The HE-STF (or another non-legacy field) 910 may not only transmit the information on the transmission bandwidth but may also transmit GI information (e.g., GI length). For example, the non-legacy PPDU may be configurable based on the transmission of the GI information.

The GI information and the bandwidth information may be independently transmitted based on the respective index through the HE-STF 910. Alternatively, the GI information and the transmission bandwidth information may be combined based on a single index and may then be transmitted. For example, one index may indicate the combination of a specific set of GI information and a specific set of bandwidth information.

According to yet another exemplary embodiment, the non-legacy STA may roughly acquire information on the FFT/IFFT size based on a signal wave of a sequence of the HE-STF 910, and, then, the non-legacy STA may confirm information on the bandwidth based on the HE-SIG A/B 930.

FIG. 10 illustrates a conceptual view of a non-legacy PPDU according to an exemplary embodiment of the present invention.

Referring to FIG. 10, the non-legacy PPDU may include a legacy part 1000 and a non-legacy part. The legacy part 1000 may include a L-STF, a L-LTF, and a L-SIG, as shown in FIG. 8. The non-legacy part may sequentially include a HE-STF 1010 and a HE-SIG A/B 1020 but may not include a HE-LTF. Although the information being included in each field is similar to the information disclosed in FIG. 8, the non-legacy PPDU disclosed in FIG. 10 may have the following characteristics.

In the non-legacy PPDU disclosed in FIG. 10, a HE-LTF does not exist separately. Therefore, the non-legacy STA cannot decode the HE-SIG A/B 1020 and the data field 1030 based on channel estimation, which is based on the HE-LTF. Accordingly, a pilot signal (or pilot tone, pilot subcarrier) may be included within the radio resource transmitting the HE-SIG A/B 1020 and the data field 1030. For example, part of the multiple subcarriers that are allocated for the transmission of the HE-SIG A/B 1020 and the data field may be used as the pilot subcarrier.

The pilot signal that is included within the radio resource transmitting the HE-SIG A/B 1020 and the data field may not only be used for the purpose of channel estimation but also for channel/frequency tracking.

If the transmission of the non-legacy PPDU can be sufficiently performed with little channel variation and within a coherence time, decoding respective to the non-legacy part may also be performed based on the channel estimation result of the L-LTF included in the legacy part.

FIG. 11 illustrates a conceptual view of a non-legacy PPDU according to an exemplary embodiment of the present invention.

Referring to FIG. 11, the non-legacy PPDU may include a legacy part 1100 and a non-legacy part. The legacy part 1100 may include a L-STF, a L-LTF, and a L-SIG, as shown in FIG. 8. The non-legacy part may sequentially include a HE-SIG A/B 1110 but may not include a HE-STF and a HE-LTF. Although the information being included in each field is similar to the information disclosed in FIG. 8, the non-legacy PPDU disclosed in FIG. 11 may have the following characteristics.

In the non-legacy PPDU disclosed in FIG. 11, a HEW-STF does not exist separately. Therefore, the STF of the legacy part may perform the function of an AGC respective to the non-legacy part. If the quantization level ranges of the ADC for each of the legacy part and the non-legacy part are not significantly different from one another, the HE-STF may not be included in the non-legacy part.

Alternatively, according to the exemplary embodiment of the present invention, the non-legacy WLAN system may periodically transmit the HE-STF and the HE-LTF. The HE-STF and the HE-LTF, which are periodically transmitted, may be designed to have minimized structures by mainly considering the synchronization function. As system information, the transmission periods of the HE-STF and the HE-LTF may be transmitted to the STA through a beacon frame, a probe response frame, or a combined response frame during the initial access of the STA.

Figure 12:
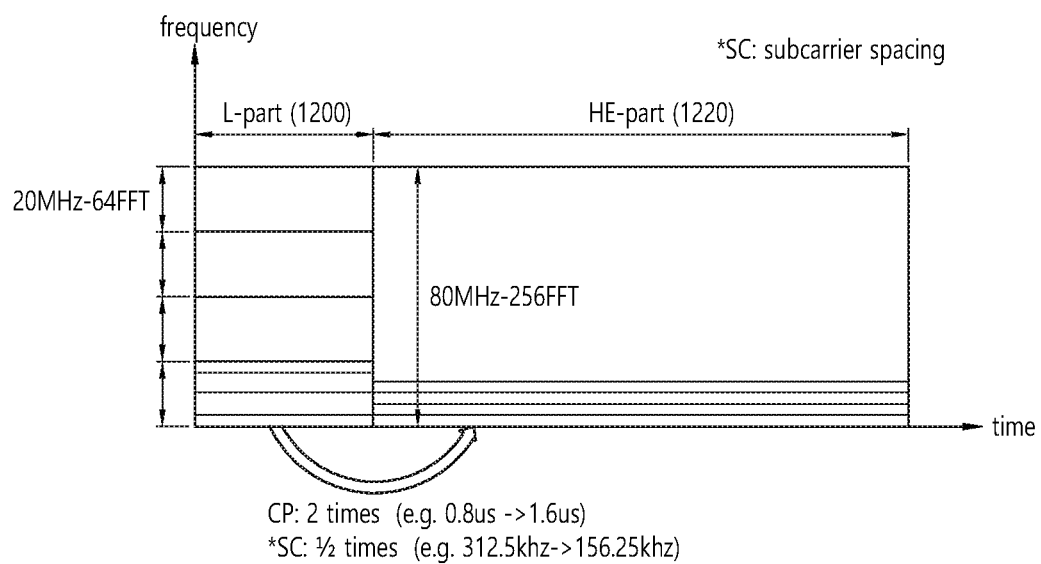
FIG. 12 illustrates a conceptual view of a method for generating a non-legacy PPDU according to an exemplary embodiment of the present invention.

FIG. 12 illustrates a conceptual view of a method for generating a non-legacy PPDU according to an exemplary embodiment of the present invention.

FIG. 12 discloses a FFT/IFFT method for generating a non-legacy PPDU.

In order to reduce the influence caused by a large delay spread of an outdoor environment a legacy part 1200 and another IFFT option (or another IFFT size) may be used for the generation of a non-legacy part. For example, in order to generate the non-legacy part 1220, an IFFT having a size that is relatively larger than the legacy part based on the same bandwidth size may be used.

In this case, different numerologies (e.g., GI size, FFT size) may be used for the generation of one PPDU.

Referring to FIG. 12, a case when the IFFT size being used for the non-legacy part 1200 within one non-legacy PPDU is two times the IFFT size being used in the legacy part 1200 is disclosed.

In case the IFFT size is two times larger, the number of subcarriers may increase to a number that is two times larger, and the subcarrier spacing may be reduced to ½ times, and the length of the duration may also be increased to two times. In case the GI portion is identical (e.g., ¼), the length (or duration) of the GI may be increased to two times. One OFDM symbol may include a valid symbol and a GI. More specifically, a total symbol duration, which corresponds to the duration of one OFDM symbol, may correspond to the sum of a valid symbol duration and a GI duration.

As another example, in case the IFFT size is four times larger, the number of subcarriers may increase to a number that is four times larger, and the subcarrier spacing may be reduced to ¼ times, and the length of the duration may also be increased to four times. In case the GI portion is identical, the length (or duration) of the GI may be increased to four times.

In case the GI portion decreases (e.g., from ¼ to ¹⁄₁₆), the length of the GI does not increase even though the IFFT size increases, and the radio resource application efficiency may be increased.

In case the numerology (or OFDM numerology) respectively used in the legacy part 1200 and the non-legacy part 1220 included in the non-legacy PPDU is different from one another, the decoding of the non-legacy PPDU may be performed by the non-legacy STA by using the method described below.

The non-legacy STA should be capable of performing decoding on the legacy part 1200 and the non-legacy part 1220 being included in the non-legacy PPDU. Therefore, the non-legacy STA may use diverse methods for performing detection on the non-legacy PPDU to which different numerologies are applied.

Figure 13:
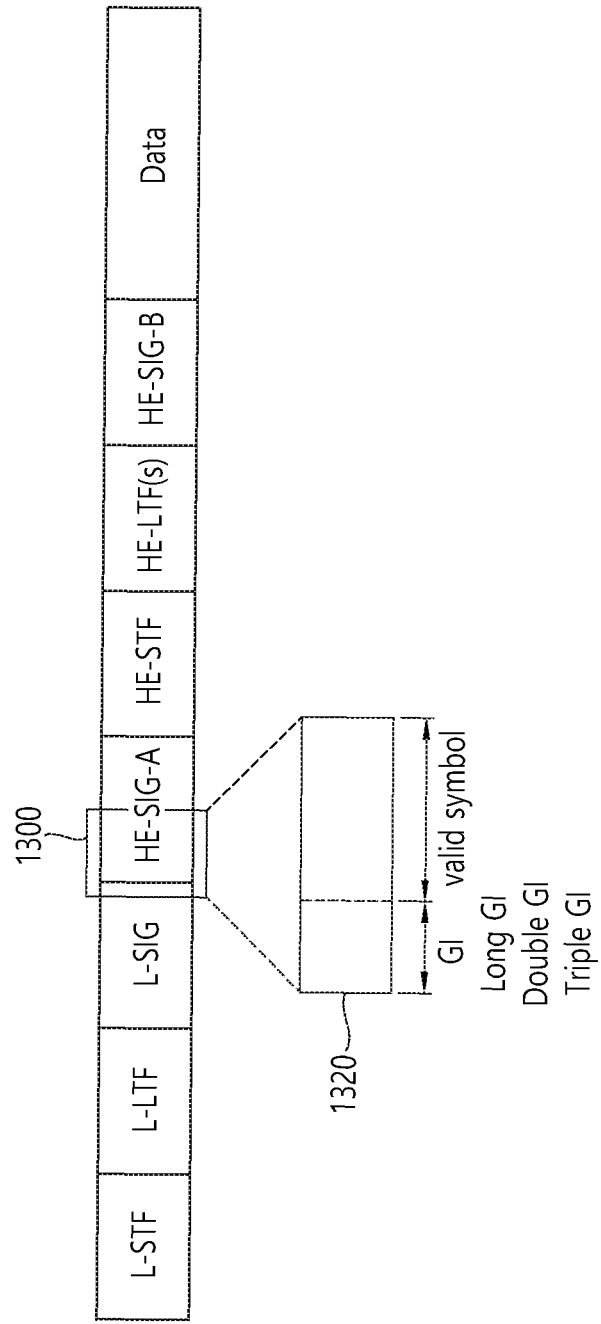
FIG. 13 illustrates a conceptual view of a method for receiving a non-legacy PPDU according to an exemplary embodiment of the present invention.

FIG. 13 illustrates a conceptual view of a method for receiving a non-legacy PPDU according to an exemplary embodiment of the present invention.

In FIG. 13, the non-legacy STA may acquire information on the numerology that is used is the OFDM symbol during a duration of the GU 1320 of the first block 1300 (or detection block (or detection symbol) (at least one OFDM symbol of the non-legacy part (at least one OFDM symbol may correspond to a temporally preceding symbol)) of the non-legacy part of the non-legacy PPDU. The STA may check which IFFT size has been used within the given bandwidth based on the detection symbol 1300, and, then, the STA may determine whether or not the received PPDU corresponds to a non-legacy PPDU.

A GI (e.g., a long GI or a double/triple GI) 1320 having a sufficient length for allowing the non-legacy STA to detect the numerology used in the PPDU may be positioned in the detection symbol (or detection block) 1300. Additionally, the GI having a sufficient length may be used not only for the purpose of numerology detection but also for resolving performance degradation caused by a long delay spread in an outdoor environment, and so on.

For example, as described above in FIG. 8, in case the non-legacy part includes a HE-SIG A, a HE-STF, a HE-LTF, and a HE-SIG-B, at least one OFDM symbol 1300 among the OFDM symbols for the transmission of the HE-SIG A, which corresponds to a field located in a first position of the non-legacy part, may include a long GI, a double/triple GI 1320. At this point, the at least one OFDM symbol including a long GI, a double/triple GI 1320 may correspond to a most temporally preceding OFDM symbol among the OFDM symbols for the HE-SIG A transmission. More specifically, the HE-SIG A may be transmitted over multiple OFDM symbols, and at least one OFDM symbol among the multiple OFDM symbols may include one of a long GI, a double GI, and a triple GI.

Although a GI 1320 may be included in each OFDM symbol transmitting the HE-SIG A, the GI 1320 are not included in each of the OFDM symbols transmitting the HE-SIG A, and the position of a double/triple GI 1320 may be concentrated in one temporally preceding OFDM symbol among the OFDM symbols transmitting the HE-SIG A.

According to another exemplary embodiment of the present invention, the HE-SIG A may be configured of multiple fields (e.g., HE-SIG A1 and HE-SIG A2). The HE-SIG A1 and the HE-SIG A2 may be sequentially included in the HE-SIG A. At this point, the at least one OFDM symbol including a long GI, a double/triple GI 1320 may correspond to a most temporally preceding OFDM symbol among the OFDM symbols for the HE-SIG A2 (or HE-SIG A1) transmission. More specifically, the HE-SIG A1 and HE-SIG A2 may be transmitted over multiple OFDM symbols, and at least one OFDM symbol among the multiple OFDM symbols may include one of a long GI, a double GI, and a triple GI.

Figure 14:
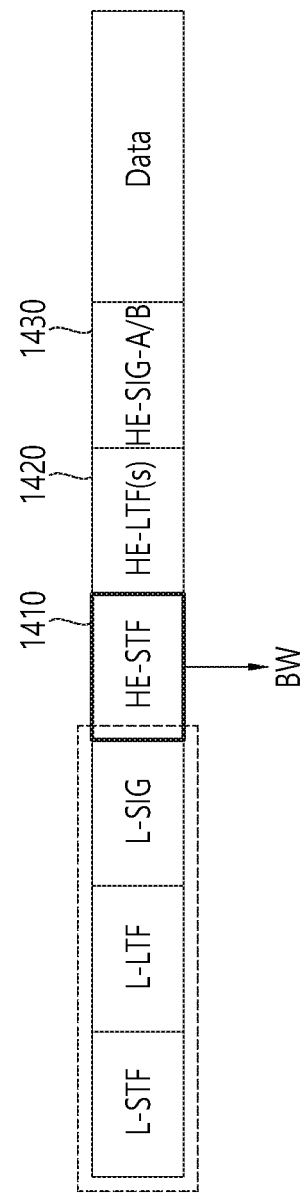
FIG. 14 illustrates a conceptual view of a method for receiving a non-legacy PPDU according to an exemplary embodiment of the present invention.

FIG. 14 illustrates a conceptual view of a method for receiving a non-legacy PPDU according to an exemplary embodiment of the present invention.

In FIG. 14, the OFDM symbol for the HE-STF 1410 of the non-legacy part may be used as a detection symbol. For example, the non-legacy STA may decide which OFDM numerology has been applied within a short period of time based on a sequence correlation characteristic of the HE-STF 1410. Additionally, the non-legacy STA may map the sequence of the HE-STF 1410 and the information on the bandwidth (e.g., bandwidth index), thereby eliminating the burden of blind detection with respect to the bandwidth.

For example, as described above in FIG. 9, in case the non-legacy part includes a HE-STF 1410, a HE-LTF 1420, and a HE-SIG A/B 1430, the OFDM symbol for the HE-STF may be used as a detection symbol. In case information on the bandwidth is transmitted based on a sequence of the HE-STF 1410, the HE-SIG A/B 1430 may not include the information on the bandwidth.

Figure 15:
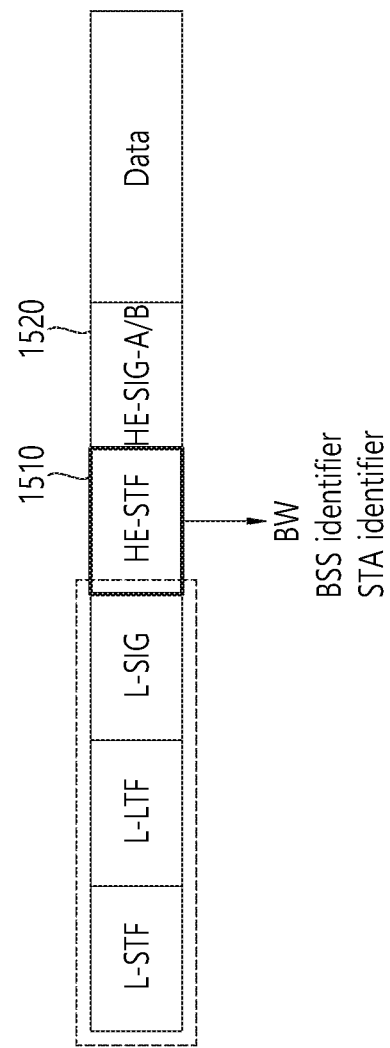
FIG. 15 illustrates a conceptual view of a method for receiving a non-legacy PPDU according to an exemplary embodiment of the present invention.

FIG. 15 illustrates a conceptual view of a method for receiving a non-legacy PPDU according to an exemplary embodiment of the present invention.

In FIG. 15, the OFDM symbol for the HE-STF (or HE-LTF) of the non-legacy part may be used as a detection symbol.

The HE-STF 1510 may include information that is described below. The HE-STF 1510 may include information on a bandwidth. A sequence of the HE-STF 1510 may indicate a bandwidth index. A pre-defined table may include information on a mapping relation between a sequence and a bandwidth. The HE-STF 1510 may be decided in accordance with a transmission bandwidth based on this table. In case the HE-STF 1510 precedes the HE-SIG A/B 1520 based on this method, the non-legacy STA may acquire information on the bandwidth without performing blind detection.

The HE-STF 1510 may include identification information of the BSS. For example, the identification information of the BSS may correspond to information for identifying a BSS (or AP) that has transmitted the non-legacy PPDU. Based on the BSS identification information, the STA may decide (or determine) whether the PPDU, which is received during the decoding step respective to the PPDU header, corresponds to a PPDU that is received from a target BSS (or target AP). The target BSS (or AP) may correspond to a BSS (or AP) from which the non-legacy STA wishes to receive the PPDU. The mapping relation between a sequence and BSS identification information may be pre-defined based on the table.

Alternatively, the HE-STF 1510 may include identification information of a receiving STA. For example, the non-legacy STA may decide whether or not to receive the PPDCU, which is received during the decoding step respective to the PPDU header based on the identification information of the receiving STA, which is included in the HE-STF 1510. The mapping relation between a sequence and identification information of the receiving STA may be pre-defined based on the table.

The identification information of the BSS and/or the identification information of the receiving STA may correspond to a BSSID (basic service set identifier), an AID (association identifier), a partial AID (partial association identifier), a MAC address, and so on.

The HE-STF 1510 may include at least one of information on the bandwidth, identification information of the BSS, and identification information of the receiving STA. Although the information on the bandwidth, the identification information of the BSS, or the identification information of the receiving STA may be individually mapped to the HE-STF 1510 and then transmitted, a combination (or set) of the information on the bandwidth, the identification information of the BSS, and the identification information of the receiving STA may be mapped to the HE-STF 1510 and then transmitted.

Figure 16:
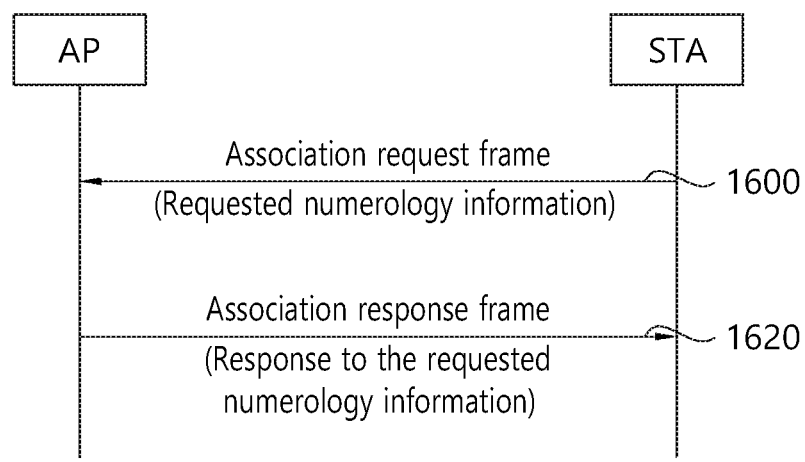
FIG. 16 illustrates a conceptual view of a method for receiving a non-legacy PPDU according to an exemplary embodiment of the present invention.

FIG. 16 illustrates a conceptual view of a method for receiving a non-legacy PPDU according to an exemplary embodiment of the present invention.

FIG. 16 discloses a method for deciding a PPDU, which is used for the communication between a non-legacy STA and an AP.

Referring to FIG. 16, the non-legacy STA may perform negotiation respective to the PPDU, which is used for the communication of the STA, during an association procedure (initial access procedure).

For example, the non-legacy PPDU may be configurable. The non-legacy PPDU may be generated based on different FFT sizes and GI lengths. In a non-legacy WLAN system, communication that is based on non-legacy PPDUs each having a different format dependent to the communication environment, STA, and so on.

For example, the non-legacy STA may perform a request respective to a non-legacy PPDU that is to be used for the communication based on an association request frame 1600 or a re-association request frame. For example, the association request frame may include numerology (FFT size, GI length, and so on) information of the non-legacy PPDU, which is selected for usage when performing communication between the non-legacy STA and the AP. The numerology information of the non-legacy PPDU, which is selected for usage when performing communication between the non-legacy STA and the AP, may also be expressed as the term request numerology information.

The AP may perform a response respective to the numerology, which is requested through the request numerology information, based on an association response frame 1620 or a re-association response frame. The response respective to the requested numerology may correspond to Accept, Reject, Update, and so on.

In case the response to the requested numerology correspond to Accept, the AP and the non-legacy STA may perform communication by using a non-legacy PPDU, which is based on the numerology requested by the non-legacy STA. In case the response to the requested numerology corresponds to Reject, the AP and the non-legacy STA may perform communication by using a non-legacy PPDU, which is based on the numerology that is decided by the AP, and not by using the non-legacy PPDU, which is based on the numerology requested by the non-legacy STA. In case the response to the requested numerology corresponds to Reject, the association response frame or re-association response frame may implicitly or explicitly include information on the numerology, which is decided by the AP.

In case the response to the requested numerology corresponds to Update, the AP and the non-legacy STA may only apply part of the numerology (e.g., FFT/IFFT size) among the numerology, which is requested by the non-legacy STA. The non-legacy PPDU may be generated by partially applying the numerology, which is decided by the AP. In case the response to the requested numerology corresponds to Update, the association response frame or re-association response frame may implicitly or explicitly include information on the numerology, which is decided by the AP.

The negotiation respective to the PPDU format between the STA and the AP shown in FIG. 16 may be performed based on the method, which is described below. The association request frame may include PPDU format request information. The PPDU format request information may include information on the PPDU for the communication of the STA with the AP. As a response to the association request frame, the STA may receive an association response frame from the AP. The association response frame may include PPDU format decision information, and the PPDU format decision information may include information on whether or not to perform communication based on the PPDU format.

According to another exemplary embodiment of the present invention, the non-legacy PPDU being used in the BSS may be BSS-specifically decided. More specifically, in a specific BSS, communication may be performed based on a specific PPDU (or a plurality of specific PPDUs). In this case, a frame being transmitted by the AP during initial access, such as a beacon frame or a probe response frame, may include PPDU information (or numerology information (e.g., FFT size, GI length, and so on)), which is supported within the BSS. For example, the AP may periodically announce PPDU information to the STA being included in the BSS based on a beacon frame. The STA that performs scanning in order to access the BSS (or AP) (hereinafter referred to as AP) may determine whether or not access to the AP can be established based on the numerology information.

In case the AP is not accessible, the STQA may perform initial access to another AP.

As shown in FIG. 16, in case of transmitting and/or receiving numerology information of a non-legacy PPDU for performing communication between a non-legacy STA and an AP, the burden of the non-legacy STA, which is required to perform blind detection respective to the PPDU in order to acquire the numerology information respective to the PPDU received from the AP, may be reduced.

A legacy STA may detect at least one OFDM symbol positioned after the legacy part. The at least one OFDM symbol positioned after the legacy part may correspond to an OFDM symbol after the OFDM symbol for the L-SIG. According to the detection result, in case the received PPDU corresponds to a PPDU that cannot be decoded, the legacy STA stops the decoding and does not perform further decoding on the following fields.

The legacy STA may perform NAV configuration based on a length field existing in the L-SIG and may delay channel access. The legacy STA may not only decide whether or not decoding of the PPDU can be carried out based on the numerology of the received PPDU, but, as another method, may also decide whether or not decoding of the PPDU can be carried out based on a constellation structure, which is transmitted over at least one OFDM symbol located after the legacy part based on the auto-detection rule, as described above. In case of legacy STAs, which do not support bandwidths of 20 MHz or more, and which do not embody a front-end of 64 FFT or more, a legacy STA may decide that the decoding of the packet cannot be supported based on the front-end of the legacy STA and may delay the channel access.

Hereinafter, the exemplary embodiment of the present invention discloses in detail the numerology of a non-legacy PPDU that can be used in the non-legacy WLAN system.

Table 2 shown below corresponds to an example of an OFDM numerology for generating a non-legacy PPDU. A non-legacy PPDU may be generated based on an IFFT that is 4 times larger than the legacy PPDU based on a given bandwidth. The II-FT that is 4 times larger may be applied to a specific field (e.g., a field after the HE-STF and HE-STF) of the non-legacy PPDU. 3 DCs (or DC tones or DC subcarriers) may be used for each band.

TABLE 2

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. $N_{ST} = N_{SD} + N_{SP}$ |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval for non-HE portion |
| $T_{GI2}$ | | | 1.6 μs | | | Double guard interval for non-HE portion |
| $T_{GIS\_HE}$ | | | 0.8 μs = $T_{DFT\_HE}/16$ | | | Short guard interval Duration (used only for HE data) |
| $T_{SYML}$ | | | 4 μs = $T_{DFT} + T_{GI}$ | | | Long GI symbol interval for non-HE portion |
| $T_{SYML\_HE}$ | | 13.6 μs = $T_{DFT\_HE} + T_{GI}$ for indoor environment or 16 μs = $T_{DFT\_HE} + T_{GI\_H}$ for outdoor environment (this value is used when applying the unified frame structure) | | | | Long GI symbol interval for HE portion |
| $T_{SYMS}$ | | | 13.6 μs = $T_{DFT\_HE} + T_{GIS\_HE}$ | | | Short GI symbol interval (used only for HE data) Short GI symbol interval (used only for HE data) |
| $T_{SYM}$ | | | TSYML or TSYMS depending on the GI used | | | Symbol interval |
| $T_{L-STF}$ | | | 8 μs = 10 * $T_{DFT}/4$ | | | Non-HT (or legacy) Short Training field duration |
| $T_{L-LTF}$ | | | 8 μs = 2 × $T_{DFT} + T_{GI2}$ | | | Non-HT (or legacy) Long Training field duration |
| $T_{L-SIG}$ | | | 4 μs = $T_{SYML}$ | | | Non-HT (or legacy) SIGNAL field duration |
| $T_{HE-SIGA}$ | | 8 μs for indoor environment or 12.8 μs = $2(T_{SYML} + 3T_{GI})$ for outdoor environment (this value is used when applying the unified frame structure) | | | | HE Signal A field duration |
| $T_{HE-STF}$ | | | $T_{SYML\_HE}$ | | | HE Short Training field duration |
| $T_{HE-LTF}$ | | | $T_{SYML\_HE}$ | | | Duration of each HE LTF symbol |
| $T_{HE-SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

FIG. 17 to FIG. 21 disclose non-legacy PPDUs for each bandwidth being generated based on Table 2.

Figure 17:
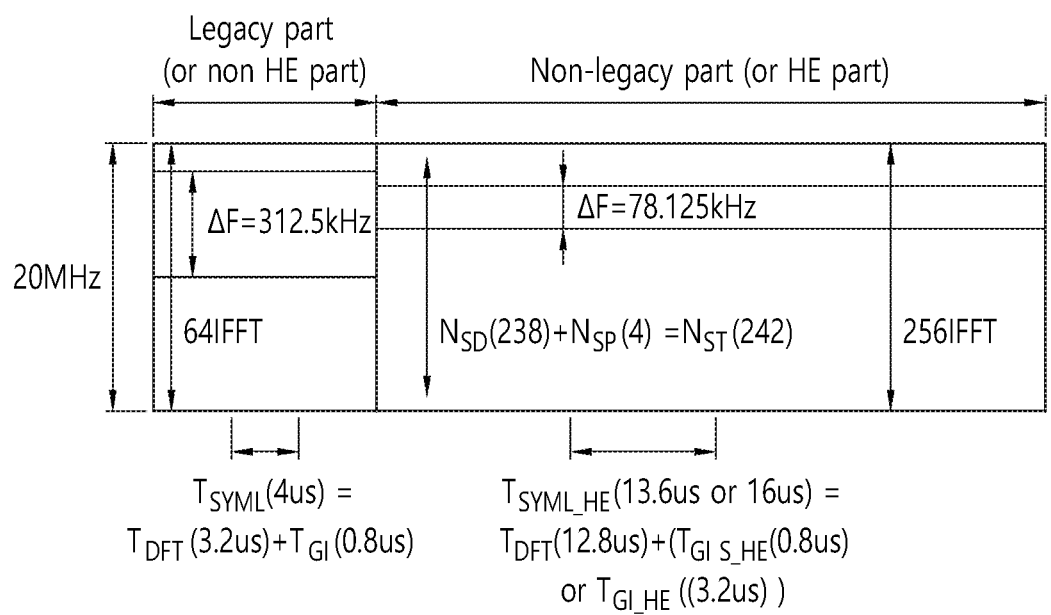
FIG. 17 illustrates a conceptual view of a non-legacy PPDU being transmitted over a 20 MHz bandwidth according to an exemplary embodiment of the present invention.

FIG. 17 illustrates a conceptual view of a non-legacy PPDU being transmitted over a 20 MHz bandwidth according to an exemplary embodiment of the present invention.

Referring to FIG. 17, 64 IFFT may be used as the IFFT for generating the legacy part (non HE part), and 256 IFFT may be used as the IFFT for generating the non-legacy part (HE part). In FIG. 17, although a case when 256 IFFT is used on the entire non-legacy part is assumed and described for the simplicity in the description, 256 IFFT may be used only on a portion (e.g., a field after the HE-STF and HE-STF) of the non-legacy part.

In case 64 IFFT is used over a bandwidth of 20 MHz, the subcarrier space ($\Delta_F$) within the legacy part may correspond to 312.5 kHz. Additionally, in case 256 IFFT is used over a bandwidth of 20 MHz, the subcarrier space ($\Delta_{FHE}$) within the legacy part may correspond to 78.125 kHz.

Additionally, a total symbol interval (or total symbol duration) ($T_{SYML}$) respective to one OFDM symbol in the legacy part may correspond to 4 µs, which is a sum of a valid symbol duration ($T_{DFT}$) (3.2 µs) and a GI duration ($T_{GI}$) (0.8 µs).

A total symbol duration ($T_{SYML\_HE}$) respective to one OFDM symbol in the non-legacy part may correspond to 13.6 µs, which is a sum of a valid symbol duration ($T_{DFT\_HE}$) (12.8 µs) and a GI duration ($T_{GIS\_HE}$) (0.8 µs). Alternatively, a total symbol duration ($T_{SYML\_HE}$) respective to one OFDM symbol in the non-legacy part may correspond to 16 µs, which is a sum of a valid symbol duration ($T_{DFT\_HE}$) (12.8 µs) and a GI duration ($T_{GIS\_HE}$) (3.2 µs). The total symbol duration may correspond to the duration of one OFDM symbol.

In the non-legacy part, the number of subcarriers ($N_{SD}$) that actually transmit data may be equal to 238, and the number of subcarriers for pilot ($N_{SP}$) may be equal to 4.

As a transmission duration for the transmission of L-STF, in case the L-STF is transmitted over two OFDM symbols, and in case $T_{GI}$ is used, $T_{L-STF}$ may be equal to 8 µs.

As a transmission duration for the transmission of L-LTF, in case the L-LTF is transmitted over two OFDM symbols, and in case $T_{GI}$ is used, $T_{L-LTF}$ may be equal to 8 µs.

As a transmission duration for the transmission of L-SIG, in case the L-SIG is transmitted over two OFDM symbols, and in case $T_{GI}$ is used, $T_{L-SIG}$ may be equal to 8 µs.

As a transmission duration for the transmission of HE-SIG A, in case the HE-SIG is transmitted over two OFDM symbols, and in case $T_{GI}$ is used, $T_{HE-SIGA}$ may be equal to 8 µs or 12.8 µs. In an indoor environment, the transmission duration of the HE-SIG A may be equal to 8 µs, and, in an outdoor environment, the transmission duration of the HE-SIG A may be equal to 12.8 µs. 12.8 µs is equal to 2 times the total symbol duration, which corresponds to 6.4 µs. The total symbol duration 6.4 µs may correspond to a sum of 4 µs, which corresponds to the total symbol duration for the legacy part, and 2.4 µs, which corresponds to 3 GIs each having a duration of 0.8 µs. More specifically, among the total symbol duration of 6.4 µs, the valid symbol duration may correspond to 3.2 µs, and the remaining 3.2 µs may be used for the GI. During such extended GI interval, the STA may vary the FFT size, so as to be capable of performing decoding respective to the field after the HE-STF and HE-STF.

As a transmission duration for the transmission of HE-STF, in case the HE-STF is transmitted over one OFDM symbol, $T_{HE-STF}$ may be equal to 13.6 µs or 16 µs in accordance with the duration of the guard interval ($T_{GI\_HE}$ or $T_{GI\_HE}$).

As a transmission duration for the transmission of HE-LTF, in case the HE-LTF is transmitted over one OFDM symbol, $T_{HE-LTF}$ may be equal to 13.6 µs or 16 µs in accordance with the duration of the guard interval ($T_{GI\_HE}$ or $T_{GI\_HE}$).

As a transmission duration for the transmission of HE-SIG B, in case the HE-SIG B is transmitted over one OFDM symbol, $T_{HE-SIGB}$ may be equal to 13.6 µs or 16 µs in accordance with the duration of the guard interval ($T_{GI\_HE}$ or $T_{GI\_HE}$).

As a number of bits of a service field being included in the data field, $N_{service}$ may be equal to 16.

As a number of tail bits per encoder being included in a BCC data field, $N_{tail}$ may be equal to 6.

Figure 18:
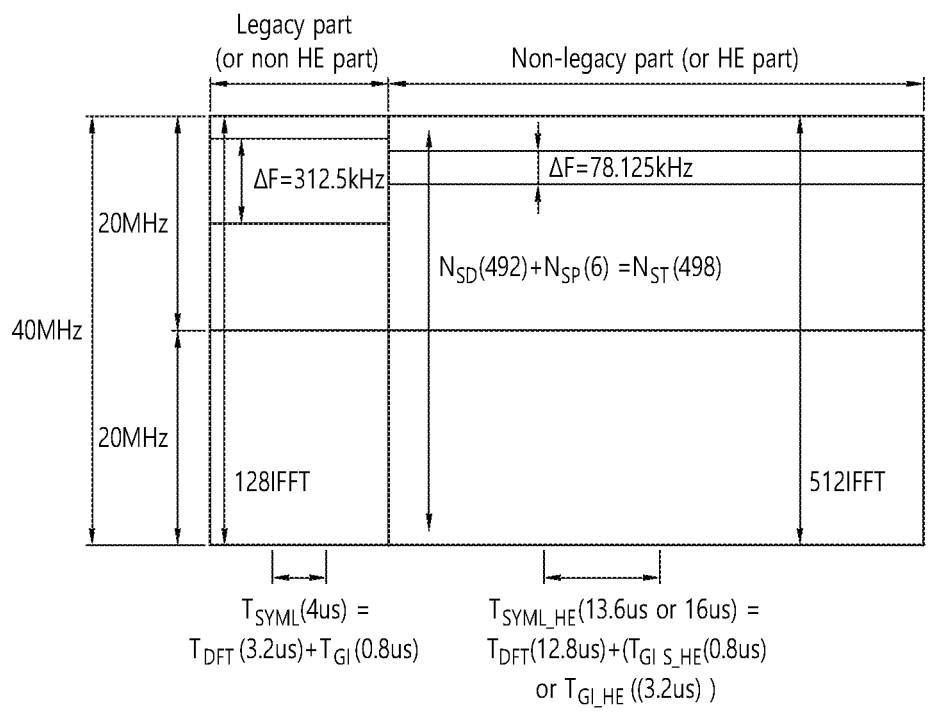
FIG. 18 illustrates a conceptual view of a non-legacy PPDU being transmitted over a 40 MHz bandwidth according to an exemplary embodiment of the present invention.

FIG. 18 illustrates a conceptual view of a non-legacy PPDU being transmitted over a 40 MHz bandwidth according to an exemplary embodiment of the present invention.

Referring to FIG. 18, in case the bandwidth is equal to 40 MHz, 128 IFFT may be used as the IFFT for generating the legacy part (non HE part), and 512 IFFT may be used as the IFFT for generating the non-legacy part (HE part). In FIG. 18, although a case when 512 IFFT is used on the entire non-legacy part is assumed and described for the simplicity in the description, 512 IFFT may be used only on a portion (e.g., a field after the HE-STF and HE-STF) of the non-legacy part.

In case 128 IFFT is used over a bandwidth of 40 MHz, the subcarrier space ($\Delta_F$) within the legacy part may correspond to 312.5 kHz. Additionally, in case 512 IFFT is used over a bandwidth of 40 MHz, the subcarrier space ($\Delta_{FHE}$) within the legacy part may correspond to 78.125 kHz.

Additionally, as described above, the total symbol duration (or symbol interval) ($T_{SYML}$) in the legacy part may be equal to 4 µs in accordance with the duration of the GI. Additionally, the total symbol duration (or symbol interval) ($T_{SYML\_HE}$) in the non-legacy part may be equal to 13.6 µs or 16 µs.

In the non-legacy part, the number of subcarriers ($N_{SD}$) that actually transmit data may be equal to 492, and the number of subcarriers for pilot ($N_{SP}$) may be equal to 6.

Figure 19:
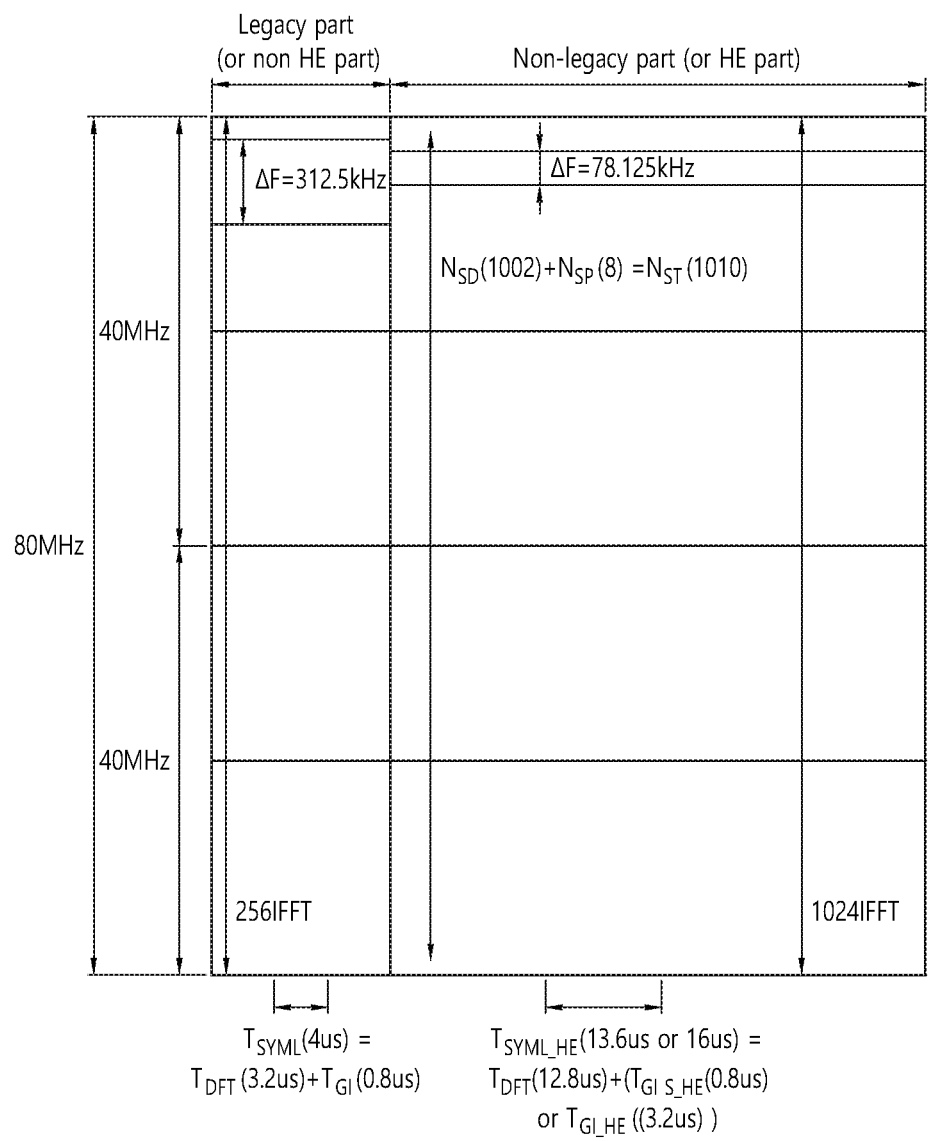
FIG. 19 illustrates a conceptual view of a non-legacy PPDU being transmitted over a 80 MHz bandwidth according to an exemplary embodiment of the present invention.

FIG. 19 illustrates a conceptual view of a non-legacy PPDU being transmitted over a 80 MHz bandwidth according to an exemplary embodiment of the present invention.

Referring to FIG. 19, in case the bandwidth is equal to 80 MHz, 256 IFFT may be used as the IFFT for generating the legacy part (non HE part), and 1024 IFFT may be used as the IFFT for generating the non-legacy part (HE part). In FIG. 19, although a case when 1024 IFFT is used on the entire non-legacy part is assumed and described for the simplicity in the description, 1024 IFFT may be used only on a portion (e.g., a field after the HE-STF and HE-STF) of the non-legacy part.

In case 256 IFFT is used over a bandwidth of 80 MHz, the subcarrier space ($\Delta_F$) within the legacy part may correspond to 312.5 kHz. Additionally, in case 1024 IFFT is used over a bandwidth of 80 MHz, the subcarrier space ($\Delta_{FHE}$) within the legacy part may correspond to 78.125 kHz.

Additionally, as described above, the total symbol duration (or symbol interval) ($T_{SYML}$) in the legacy part may be equal to 4 µs or 4.8 µs in accordance with the duration of the GI. Additionally, the total symbol duration (or symbol interval) ($T_{SYML\_HE}$) in the non-legacy part may be equal to 13.6 µs or 16 µs.

In the non-legacy part, the number of subcarriers ($N_{SD}$) that actually transmit data may be equal to 1002, and the number of subcarriers for pilot ($N_{SP}$) may be equal to 8.

Figure 20:
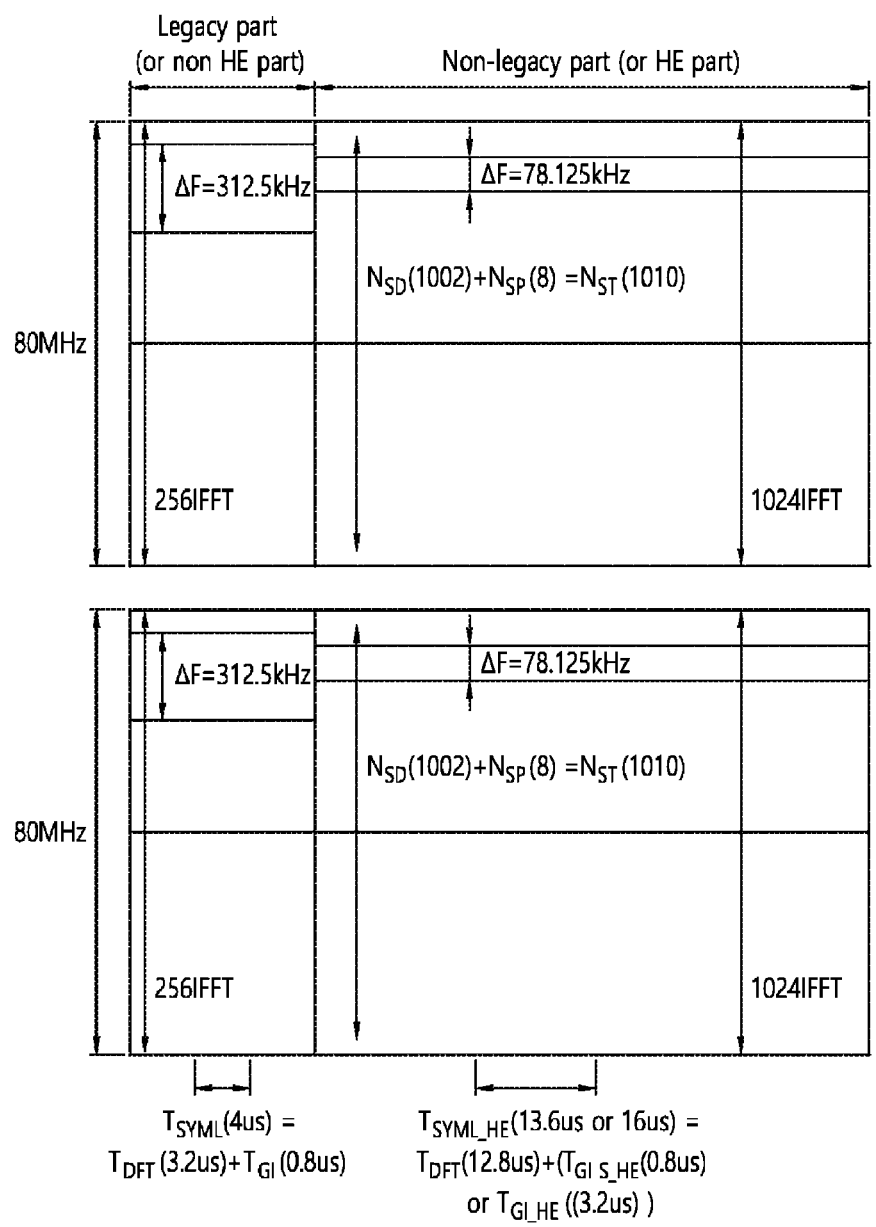
FIG. 20 illustrates a conceptual view of a non-legacy PPDU being transmitted over a 80 MHz+80 MHz bandwidth according to an exemplary embodiment of the present invention.

FIG. 20 illustrates a conceptual view of a non-legacy PPDU being transmitted over a 80 MHz+80 MHz bandwidth according to an exemplary embodiment of the present invention.

Referring to FIG. 20, in case the bandwidth is equal to 80 MHz+80 MHz, with respect to each 80 MHz bandwidth, 256 IFFT may be used as the IFFT for generating the legacy part (non HE part), and 1024 IFFT may be used as the IFFT for generating the non-legacy part (HE part). In FIG. 20, although a case when 1024 IFFT is used on the entire non-legacy part is assumed and described for the simplicity in the description, 1024 IFFT may be used only on a portion (e.g., a field after the HE-STF and HE-STF) of the non-legacy part.

In case 256 IFFT is used over a bandwidth of 80 MHz, the subcarrier space ($\Delta_F$) within the legacy part may correspond to 312.5 kHz. Additionally, in case 1024 IFFT is used over a bandwidth of 80 MHz, the subcarrier space ($\Delta_{FHE}$) within the legacy part may correspond to 78.125 kHz.

Additionally, as described above, the total symbol duration (or symbol interval) ($T_{SYML}$) in the legacy part may be equal to 4 μs. Additionally, the total symbol duration (or symbol interval) ($T_{SYML\_HE}$) in the non-legacy part may be equal to 13.6 μs or 16 μs.

The number of subcarriers ($N_{SD}$) that actually transmit data through the non-legacy part within each bandwidth of 80 MHz may be equal to 1002, and the number of subcarriers for pilot ($N_{SP}$) may be equal to 8.

Figure 21:
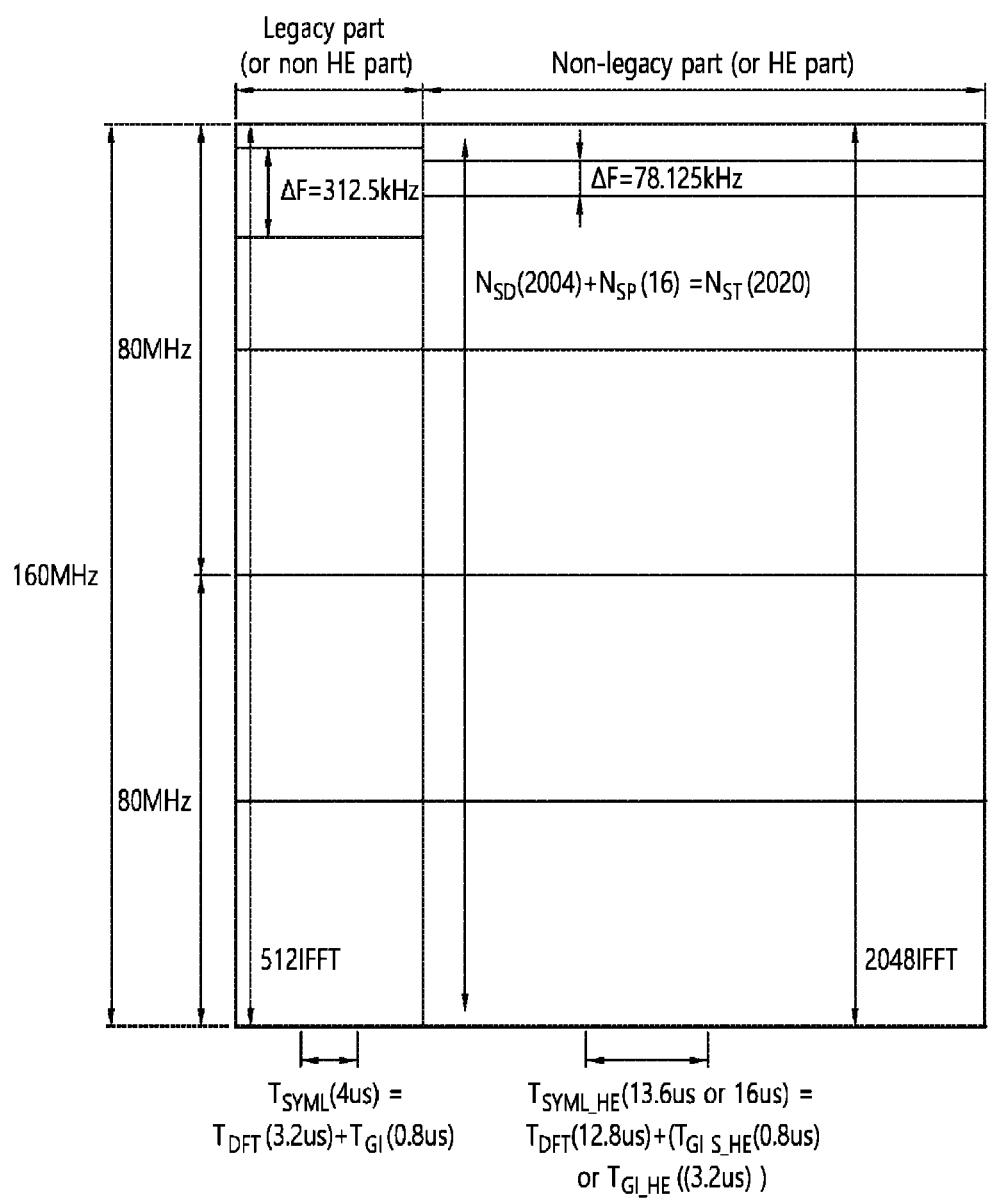
FIG. 21 illustrates a conceptual view of a non-legacy PPDU being transmitted over a 160 MHz bandwidth according to an exemplary embodiment of the present invention.

FIG. 21 illustrates a conceptual view of a non-legacy PPDU being transmitted over a 160 MHz bandwidth according to an exemplary embodiment of the present invention.

Referring to FIG. 21, in case the bandwidth is equal to 160 MHz, 512 IFFT may be used as the IFFT for generating the legacy part (non HE part), and 2048 IFFT may be used as the IFFT for generating the non-legacy part (HE part). In FIG. 21, although a case when 2048 IFFT is used on the entire non-legacy part is assumed and described for the simplicity in the description, 2048 IFFT may be used only on a portion (e.g., a field after the HE-STF and HE-STF) of the non-legacy part.

In case 512 IFFT is used over a bandwidth of 160 MHz, the subcarrier space ($\Delta_F$) within the legacy part may correspond to 312.5 kHz. Additionally, in case 2048 IFFT is used over a bandwidth of 160 MHz, the subcarrier space ($\Delta_{FHE}$) within the legacy part may correspond to 78.125 kHz.

Additionally, as described above, the total symbol duration (or symbol interval) ($T_{SYML}$) in the legacy part may be equal to 4 μs. Additionally, the total symbol duration (or symbol interval) ($T_{SYML\_HE}$) in the non-legacy part may be equal to 13.6 μs or 16 μs.

In the non-legacy part, the number of subcarriers ($N_{SD}$) that actually transmit data may be equal to 2004, and the number of subcarriers for pilot ($N_{SP}$) may be equal to 16.

Hereinafter, the non-legacy PPDU will be disclosed in detail.

Figure 22:
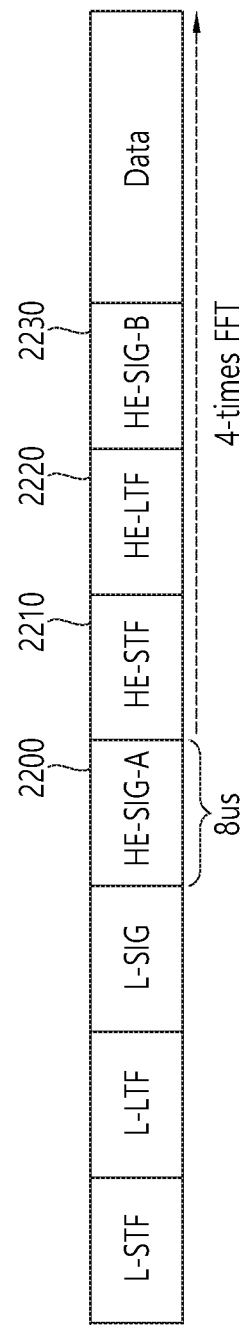
FIG. 22 illustrates a conceptual view of a non-legacy PPDU according to an exemplary embodiment of the present invention.

FIG. 22 illustrates a conceptual view of a non-legacy PPDU according to an exemplary embodiment of the present invention.

Referring to FIG. 22, the non-legacy PPDU may include a legacy part (L-STF, L-LTF, L-SIG) and a non-legacy part. The non-legacy part may include a HE-SIG A 2200, a HE-STF 2210, a HE-LTF 2220, and a HE-SIG B 2230.

The HE-SIG A 2200, which comes immediately after the legacy part, is generated based on the same IFFT as the legacy part, and the HE-STF 2210, which is transmitted after the HE-SIG A 2200, may be generated based on an IFFT that is larger than the IFFT used in the legacy part. The HE-SIG A 2200 may be transmitted over two OFDM symbols. In case the total symbol duration corresponding to the duration of one OFDM symbol is equal to 4 μs, the transmission duration for transmitting the HE-SIG A 2200 may be equal to 8 μs(=2*$T_{SYML}$).

The HE-STF 2210 may be transmitted over one OFDM symbol, and the transmission duration of the HE-STF 2210 may be equal to 13.6 μs. The duration of one OFDM symbol for transmitting the HE-STF 2210 may include a valid symbol duration ($T_{DFT\_HE}$) (12.8 μs) and a GI duration ($T_{GIS\_HE}$) (0.8 μs) wherein the FFT/IFFT has been performed.

The HE-LTF 2220 may be transmitted over one OFDM symbol, and the transmission duration of the HE-LTF 2220 may be equal to 13.6 μs.

The HE-SIG B 2230 may be transmitted over one OFDM symbol, and the transmission duration of the HE-SIG B 2230 may be equal to 13.6 μs.

The duration of one OFDM symbol for the transmission of the data field may be equal to 13.6 μs.

In the non-legacy PPDU disclosed in FIG. 22, the total symbol duration ($T_{SYML\_HE}$) or a duration of a guard interval (GI) ($T_{GI}$ or $T_{GI\_HE}$) may be varied, and such information may be transmitted by the AP or the STA. For example, the AP may transmit information on the total symbol duration or guard interval as the system information to the STA through the beacon frame or the probe response frame, and so on. The STA may perform decoding on the non-legacy PPDU based on the received information on the total symbol duration and/or the information on the duration of the guard interval. The AP or STA may vary the total symbol duration and/or guard interval duration that is used in the non-legacy PPDU. More specifically, the non-legacy PPDU is configurable.

Figure 23:
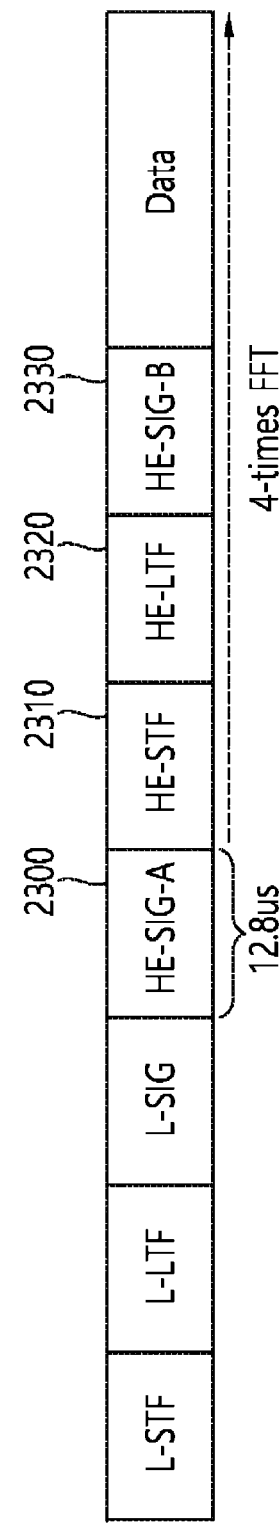
FIG. 23 illustrates a conceptual view of a non-legacy PPDU according to an exemplary embodiment of the present invention.

FIG. 23 illustrates a conceptual view of a non-legacy PPDU according to an exemplary embodiment of the present invention.

Referring to FIG. 23, the non-legacy PPDU may include a legacy part and a non-legacy part.

Unlike in FIG. 22, the transmission duration of the HE-SIG A 2300 of the non-legacy part may be equal to 12.8 μs.

In comparison with the size of the IFFT used in the legacy part from the HE-STF 2310, an IFFT having a size that is four times larger may be applied. The duration of an OFDM symbol (or the total symbol duration) for the transmission of the HE-STF 2310, which is included in the non-legacy PPDU for an outdoor environment may be equal to 16 μs. In case the duration of the GI ($T_{GI\_HE}$) (3.2 μs) for the transmission of the HE-STF 2310 is four times the duration of the GI ($T_{GI}$) (0.8 μs), which is used in the legacy part, the coverage may be varied as much as the increased amount of the GI. More specifically, the transmission coverage of the HE-SIG A 2300 and the transmission coverage of the HE-STF 2310 and the field after the HE-STF 2310 may be different from one another.

Therefore, according to the exemplary embodiment of the present invention, the transmission duration of the HE-SIG A 2300 may be increased from 2*$T_{SYML}$ to 2($T_{SYML}$+3$T_{GI}$). More specifically, the duration of the GI of each OFDM symbol for transmitting the HE-SIG A 2300 may be increased by 3$T_{GI}$. In this case, since the duration of the GI corresponding to one $T_{GI}$ is included in the existing $T_{SYML}$, the duration of the total GIs of each OFDM symbol for transmitting the HE-SIG A 2300 may be equal to 4*$T_{GI}$. Therefore, the transmission coverage of the HE-SIG A 2300 may be identical to the transmission coverage of the HE-STF 2310 and the field after the HE-STF 2310. Based on the adjustment of the duration of the GI, the non-legacy PPDU, which is disclosed in FIG. 23, may be used both indoors and outdoors.

The duration of the GI, which is used for the transmission of the HE-SIG A 2300, may be decided in accordance with the IFFT size, which is used for generating the field after the HE-SIG A 2300. For example, in case the IFFT size used for generating the HE-SIG A 2300 and the IFFT size used for generating the field after the HE-SIG A 2300 have a size difference of y times, the transmission duration of the HE-SIG A 2300 may be equal to X*($T_{SYML}$+(y−1)*$T_{GI}$). Herein, X may correspond to a number of OFDM symbols that are used for the transmission of the HE-SIG A 2300. At this point, considering the overhead of the preamble, a positive integer value that is smaller than y may be used instead of the difference in IFFT size. For example, in the equation presented above, y−1 may also be equal to a value of y−2 or y−3.

More specifically, in the non-legacy PPDU disclosed in FIG. 23, the transmission duration of the HE-SIG A 2300 may be equal to 12.8 μs (a case when the transmission is being carried out over one OFDM symbol is assumed herein), the transmission duration of the HE-STF 2310 may be equal to 16 μs (a case when the transmission is being carried out over one OFDM symbol is assumed herein), the transmission duration of the HE-LTF 2320 may be equal to 16 μs (a case when the transmission is being carried out over one OFDM symbol is assumed herein), the transmission duration of the HE-SIG B 2330 may be equal to 16 μs (a case when the transmission is being carried out over one OFDM symbol is assumed herein), and the symbol duration of one OFDM symbol for transmitting the data field may be equal to 16 μs. In case the number of OFDM symbols for transmitting each field is different from one another, the transmission duration of each field may vary.

In the non-legacy PPDU disclosed in FIG. 23, the total symbol duration ($T_{SYML\_HE}$) or the duration of the guard interval (GI) ($T_{GIS\_HE}$ or $T_{GI\_HE}$) may be changed, and such information may be transmitted by the AP. For example, the AP may transmit the information on the total symbol duration or the guard interval as the system information to the STA through a beacon frame or probe response frame, and so on. The STA may perform decoding on the non-legacy PPDU based on the received information on the total symbol duration and/or the information on the duration of the guard interval. The AP or STA may vary the total symbol duration and/or guard interval duration that is used in the non-legacy PPDU. More specifically, the non-legacy PPDU is configurable.

Figure 24:
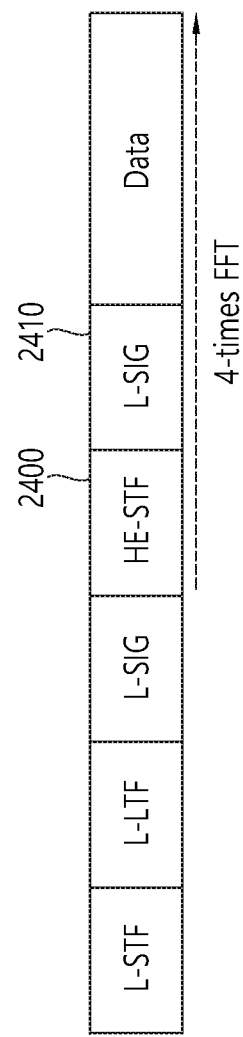
FIG. 24 illustrates a conceptual view of a non-legacy PPDU according to an exemplary embodiment of the present invention.

FIG. 24 illustrates a conceptual view of a non-legacy PPDU according to an exemplary embodiment of the present invention.

Referring to FIG. 24, the non-legacy PPDU may include a legacy part and a non-legacy part. In the non-legacy part, the HE-STF 2400 may precede the HE-SIG 2410.

For example, in comparison with the size of the IFFT used in the legacy part from the HE-STF 2400, an IFFT having a size that is four times larger may be applied.

The total symbol duration ($T_{SYML\_HE}$) of the OFDM symbol for transmitting the HE-STF 2400 may be equal to 13.6 μs or 16 μs. For example, in an indoor environment, the HE-STF 2400 is transmitted over an OFDM symbol having a total symbol duration of 13.6 μs, and, in an outdoor environment, the HE-STF 2400 may be transmitted over an OFDM symbol having a total symbol duration of 16 μs.

The information on $T_{SYML\_HE}$ may be transmitted as system information from the AP to the STA based on a beacon frame or probe response frame. Alternatively, a duration of the guard interval (GI) ($T_{GIS\_HE}$ or $T_{GI\_HE}$), which is used in the non-legacy PPDU, may be transmitted as system information from the AP to the STA based on a beacon frame or probe response frame. The STA may perform decoding on the non-legacy PPDU based on the received information on the total symbol duration and/or information on the duration of the guard interval. The AP may vary the total symbol duration and/or the guard interval duration, which is used in the non-legacy PPDU. More specifically, the non-legacy PPDU is configurable.

The non-legacy PPDU, which is disclosed in FIG. 24, may not include the HE-LTF. The frequency resource for transmitting the HE-STF 2400 and HE-SIG 2410 and a data field may include a pilot tone (pilot subcarrier). The pilot tone may be used for channel tracking (e.g., CFO (channel frequency offset) tracking) and/or channel estimation. Within the frequency resource (or multiple subcarriers) for transmitting the HE-STF 2400 and HE-SIG 2410 and the data field, the pilot tone may be allocated within the same subcarrier index (or the same frequency resource).

More specifically, in the non-legacy PPDU disclosed in FIG. 24, the transmission duration of the HE-STF 2400 may be equal to 13.6 μs or 16 μs (a case when the transmission is being carried out over one OFDM symbol is assumed herein), the transmission duration of the HE-SIG 2410 may be equal to 13.6 μs or 16 μs (a case when the transmission is being carried out over one OFDM symbol is assumed herein), and the symbol duration of one OFDM symbol for transmitting the data field may be equal to 13.6 μs or 16 μs. In case the number of OFDM symbols for transmitting each field is different from one another, the transmission duration of each field may vary.

Figure 25:
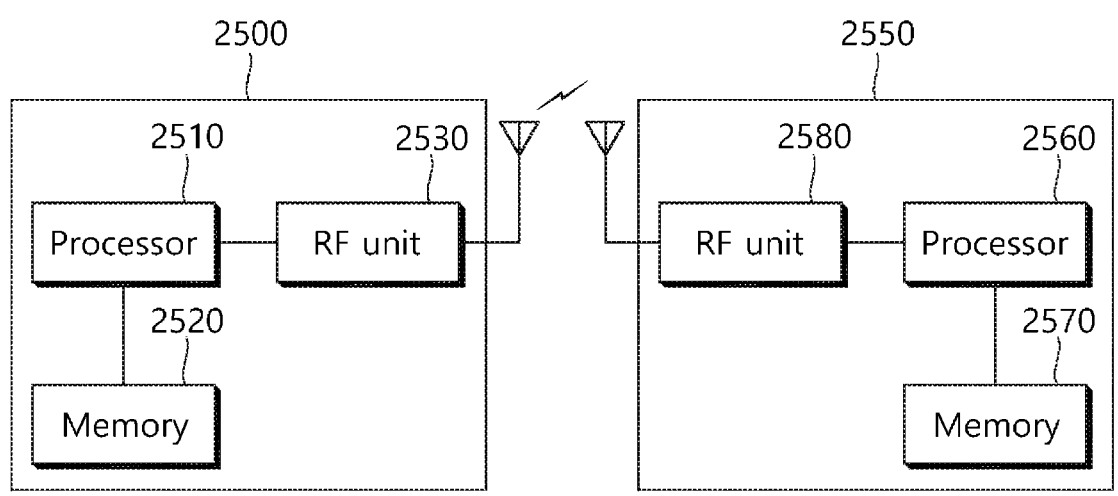
FIG. 25 illustrates a block diagram showing a wireless communication system in which the disclosure of this specification is implemented.

FIG. 25 illustrates a block diagram showing a wireless communication system in which the disclosure of this specification is implemented.

Referring to FIG. 25, as an STA that can realize the above-described exemplary embodiment, the wireless device 2500 may correspond to an AP 2500 or a non-AP STA (non-AP station) 2550.

The AP 2500 includes a processor 2510, a memory 2520, and a RF unit (radio frequency unit) 2530.

The RF unit 2530 is connected to the processor 2510, thereby being capable of transmitting and/or receiving radio signals.

The processor 2510 implements the functions, processes, and/or methods proposed in the present invention. For example, the processor 2510 may be realized to perform the operations of the wireless device according to the above-described exemplary embodiments of the present invention. The processor may perform the operations of the wireless device, which are disclosed in the exemplary embodiments of FIG. 3 to FIG. 24.

For example, the processor 2520 may perform a response respective to the numerology based on an association response frame or a re-association response frame, which is transmitted by the STA. The response respective to the numerology may correspond to Accept, Reject, Update, and so on.

The STA 2550 includes a processor 2560, a memory 2570, and a RF unit (radio frequency unit) 2580.

The RF unit 2580 is connected to the processor 2560, thereby being capable of transmitting and/or receiving radio signals.

The processor 2560 implements the functions, processes, and/or methods proposed in the present invention. For example, the processor 2560 may be realized to perform the operations of the wireless device according to the above-described exemplary embodiments of the present invention. The processor may perform the operations of the wireless device, which are disclosed in the exemplary embodiments of FIG. 3 to FIG. 24.

For example, the processor 2560 may transmit an association request frame to the AP and then receive an association response frame from the AP as a response to the association request frame, wherein the association response frame may be configured to include PPDU format decision information.

The association request frame may include PPDU (physical layer protocol data unit) format request information, and the association response frame may include PPDU format decision information. The PPDU format request information may include information on a PPDU format allowing the STA to establish communication with the AP, and the PPDU format decision information may include information on whether or not to perform the communication based on the PPDU format.

The processor 2510 and 2560 may include an ASIC (application-specific integrated circuit), another chip set, a logical circuit, a data processing device, and/or a converter converting a baseband signal and a radio signal to and from one another. The memory 2520 and 2570 may include a ROM (read-only memory), a RAM (random access memory), a flash memory, a memory card, a storage medium, and/or another storage device. The RF unit 2530 and 2580 may include one or more antennas transmitting and/or receiving radio signals.

When the exemplary embodiment is implemented as software, the above-described method may be implemented as a module (process, function, and so on) performing the above-described functions. The module may be stored in the memory 2520 and 2570 and may be executed by the processor 2510 and 2560. The memory 2520 and 2570 may be located inside or outside of the processor 2510 and 2560 and may be connected to the processor 2510 and 2560 through a diversity of well-known means.

What is claimed is:

1. A method for receiving data units in a wireless local area network (WLAN), the method comprising:
    transmitting, by a station (STA), an association request frame to an access point (AP) corresponding to a basic service set (BSS),
    wherein the association request frame includes physical layer protocol data unit (PPDU) format request information indicating a PPDU format of a PPDU to be received from the AP,
    wherein the PPDU format is defined as a first part for a legacy STA and a second part for a non-legacy STA,
    wherein the first part sequentially includes a legacy short training field (L-STF), a legacy long training field (L-LTF), and a legacy signal (L-SIG) field,
    wherein the second part sequentially includes a high efficiency-signal (HE-SIG) A field, a HE-STF, a HE-LTF and a data field for a payload,
    wherein the L-STF, the L-LTF, the L-SIG field, and the HE-SIG A field are generated based on a first Inverse Fast Fourier Transform (IFFT),
    wherein the HE-STF, the HE-LTF, and the data field are generated based on a second IFFT, and
    wherein a size of the second IFFT is larger than a size of the first IFFT;
    receiving, by the STA, an association response frame from the AP as a response to the association request frame,
    wherein the association response frame includes PPDU format decision information indicating whether the PPDU format is approved by the AP; and
    if the PPDU format is approved, receiving, by the STA, the PPDU from the AP based on the PPDU format.

2. The method of claim 1,
    wherein the HE-SIG A field includes BSS color information for identifying the BSS and bandwidth information for the HE-STF, the HE-LTF, and the data field that are fields after the HE-SIG A field, and
    wherein the HE-STF is used for automatic gain control estimation for decoding the PPDU.

3. The method of claim 1,
    wherein the size of the second IFFT is 4 times larger than the size of the first IFFT.

4. The method of claim 1,
    wherein the HE-SIG A field is transmitted over two first orthogonal frequency division multiplexing (OFDM) symbols,
    wherein the HE-STF is transmitted over one second OFDM symbol,
    wherein a duration of the first OFDM symbol includes a first guard interval (GI) duration of 0.8 us and a first valid symbol duration of 3.2 us, and
    wherein a duration of the second OFDM symbol includes a second GI duration of 3.2 us and a second valid symbol duration of 12.8 us or a third GI duration of 0.8 us and a second valid symbol duration of 12.8 us.

5. The method of claim 1,
    wherein the HE-SIG A field is transmitted over multiple orthogonal frequency division multiplexing (OFDM) symbols, and
    wherein at least one OFDM symbol of the multiple OFDM symbols includes one of a long guard interval (GI), a double GI, and a triple GI.

6. The method of claim 1,
    wherein the second part further includes a HE-SIG B field,
    wherein the HE-SIG B field includes resource allocation information, and
    wherein the resource allocation information includes information on radio resource being allocated to each multiple STAs belonging to the BSS based on orthogonal frequency division multiple access (OFDMA).

7. A station (STA) receiving data units in a wireless local area network (WLAN), the STA comprising:
    a radio frequency (RF) unit configured to transmit and receive radio signals; and
    a processor being optionally connected to the RF unit,
    wherein the processor is configured to:
        transmit an association request frame to an access point (AP) corresponding to a basic service set (BSS),
        wherein the association request frame includes physical layer protocol data unit (PPDU) format request information indicating a PPDU format of a PPDU to be received from the AP,
        wherein the PPDU format is defined as a first part for a legacy STA and a second part for a non-legacy STA,
        wherein the first part sequentially includes a legacy short training field (L-STF), a legacy long training field (L-LTF), and a legacy signal (L-SIG) field,
        wherein the second part sequentially includes a high efficiency-signal (HE-SIG) A field, a HE-STF, a HE-LTF and a data field for a payload,
        wherein the L-STF, the L-LTF, the L-SIG field, and the HE-SIG A field are generated based on a first Inverse Fast Fourier Transform (IFFT),
        wherein the HE-STF, the HE-LTF, and the data field are generated based on a second IFFT, and
        wherein a size of the second IFFT is larger than a size of the first IFFT;
        receive an association response frame from the AP as a response to the association request frame,
        wherein the association response frame includes PPDU format decision information indicating whether the PPDU format is approved by the AP; and
        if the PPDU format is approved, receive the PPDU from the AP based on the PPDU format.

8. The STA of claim 7,
    wherein the HE-SIG A field includes color information for identifying the BSS and bandwidth information for the HE-STF, the HE-LTF, and the data field that are fields after the HE-SIG A field, and wherein the HE-STF is used for automatic gain control estimation for decoding the PPDU.

9. The STA of claim 7, wherein the size of the second IFFT is 4 times larger than the size of the first IFFT.

10. The STA of claim 7, wherein the HE-SIG A field is transmitted over two first orthogonal frequency division multiplexing (OFDM) symbols, wherein the HE-STF is transmitted over one second OFDM symbol, wherein a duration of the first OFDM symbol includes a first guard interval (GI) duration of 0.8 us and a first valid symbol duration of 3.2 us, and wherein a duration of the second OFDM symbol includes a second GI duration of 3.2 us and a second valid symbol duration of 12.8 us or a third GI duration of 0.8 us and a second valid symbol duration of 12.8 us.

11. The STA of claim 7, wherein the HE-SIG A field is transmitted over multiple orthogonal frequency division multiplexing (OFDM) symbols, and wherein at least one OFDM symbol of the multiple OFDM symbols includes one of a long guard interval (GI), a double GI, and a triple GI.

12. The STA of claim 7, wherein the second part further includes a HE-SIG B field, wherein the HE-SIG B field includes resource allocation information, and wherein the resource allocation information includes information on radio resource being allocated to each multiple STAs belonging to the BSS based on orthogonal frequency division multiple access (OFDMA).

* * * * *